(12) United States Patent
Jo

(10) Patent No.: US 12,488,836 B1
(45) Date of Patent: Dec. 2, 2025

(54) MONOTONIC COUNTER IMPLEMENTED IN NON-VOLATILE RESISTIVE SWITCHING MEMORY

(71) Applicant: Crossbar, Inc., Santa Clara, CA (US)

(72) Inventor: Sung Hyun Jo, Sunnyvale, CA (US)

(73) Assignee: Crossbar, Inc., Santa Clara, CA (US)

( * ) Notice: Subject to any disclaimer, the term of this patent is extended or adjusted under 35 U.S.C. 154(b) by 340 days.

(21) Appl. No.: 18/109,029

(22) Filed: Feb. 13, 2023

(51) Int. Cl.
*G11C 13/00* (2006.01)

(52) U.S. Cl.
CPC ........ *G11C 13/0097* (2013.01); *G11C 13/004* (2013.01); *G11C 13/0069* (2013.01)

(58) Field of Classification Search
CPC .............. G11C 13/0097; G11C 13/004; G11C 13/0069
See application file for complete search history.

(56) References Cited

U.S. PATENT DOCUMENTS

2009/0290411 A1\* 11/2009 Xi ................ G11C 11/5685
365/163
2019/0035458 A1\* 1/2019 Lu ................ G06F 12/1425

\* cited by examiner

*Primary Examiner* — Uyen Smet
(74) *Attorney, Agent, or Firm* — Wegman Hessler Valore

(57) ABSTRACT

A monotonic counter implemented at least in part in non-volatile memory hardware is described herein. Compared with software counting algorithms, the disclosed embodiments significantly enhance security of disclosed monotonic counters. In some aspects of the disclosed embodiments, a non-binary coded decimal (BCD) counting algorithm can be utilized in whole or in part to enhance longevity of non-volatile memory cells storing monotonic counter values. Various aspects of the present specification disclose both a monotonic increase counter, and a monotonic decrease counter.

9 Claims, 17 Drawing Sheets

ALTERNATE EXAMPLE NON BCD MONOTONIC DECREASE COUNT ALGORITHM
500B

MONOTONIC COUNTER IMPLEMENTED IN NON-VOLATILE RESISTIVE SWITCHING MEMORY

INCORPORATION BY REFERENCE

U.S. patent application Ser. No. 17/223,817 filed Apr. 6, 2021 and titled DISTINCT CHIP IDENTIFIER SEQUENCE UTILIZING UNCLONABLE CHARACTERISTICS OF RESISTIVE MEMORY ON A CHIP, is hereby incorporated by reference herein in its entirety and for all purposes.

TECHNICAL FIELD

The subject disclosure relates generally to resistive switching memory structures, and as one illustrative example, a monotonic counter implemented in resistive switching memory structures of a semiconductor device.

BACKGROUND

Security in electronic communication is relevant at micro and macro scales, from operations of components within a single die to network communications of communicatively interconnected computing devices. Moreover, communication security is relevant at various scales in between the micro and macro levels, as well as for unconventional (or even heretofore unknown) inter-operations of electronic devices. Although variations exist, probably the most common application in the modern context for securing electronic communication is with cryptographic algorithms.

As a general characteristic, cryptographic algorithms tend to leverage highly complex computational schemes that make breaking the algorithm practically impossible, though in most cases not theoretically impossible. The greater the complexity of the cryptographic algorithm the more practical difficulty in breaking it. For this statement to be true, however, certain mathematical assumptions that the algorithm relies upon must also hold true. One such assumption is the true randomness of a numbering scheme leveraged by an algorithm. Where systematic patterns exist within the numbering scheme or the mechanism utilized to generate (random) numbers, an algorithm is more vulnerable to being compromised. To this end, the national institute on standards and technology (NIST) maintains tests for randomness of number generators for use in cryptography applications (see, e.g., A. Rukhin, et al., "A Statistical Test Suite for Random and Pseudorandom Number Generators for Cryptographic Applications", NIST, vol. 800-22, no. rev 1a, p. 131, 2010).

One technique for generating non-correlated number sequences is by leveraging characteristics of physical structures that have high natural entropy. When utilizing entropic physical structures within a semiconductor die itself, a number sequence for an application associated with the die can be produced native to that die. If the physical structures can reliably reproduce a consistent output in response to an input condition, a function can be derived from those physical structures. Moreover, where the entropy associated with the physical structures is independent of the process used to create the structures, the function can model a one-way function that is mathematically difficult to invert. Such structures are referred to as physical unclonable functions (PUFs) and can be useful for generating data having high randomness.

In light of the above, the Assignee of the present disclosure continues to develop and pursue practical utilizations of physical characteristics of integrated circuit devices.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Aspects of various embodiments of the present disclosure provide for a monotonic counter implemented at least in part in non-volatile memory hardware. Compared with software counting algorithms, the disclosed embodiments significantly enhance security of disclosed monotonic counters. In some aspects of the disclosed embodiments, a non-binary coded decimal (BCD) counting algorithm can be utilized in whole or in part to enhance longevity of non-volatile memory cells storing monotonic counter values. Further embodiments disclose both a monotonic increase counter, and a monotonic decrease counter.

In one or more additional embodiments, disclosed is a method for counting in non-volatile resistive switching memory. The method can comprise initiating a count algorithm, and initializing a number, M, of non-volatile resistive switching memory cells for storing at least a portion of a variable count and characterizing one cell of the non-volatile resistive switching memory cells as a first cell and another cell of the non-volatile resistive switching memory cells as an $M^{th}$ cell. The method can further comprise detecting occurrence of an event identified by the count algorithm and changing a state of the first bit of the non-volatile resistive switching memory cells. Additionally, the method can comprise detecting a second occurrence of the event and changing a state of a second bit, adjacent to the first bit, of the non-volatile resistive switching memory cells. Still further, the method can comprise detecting an $M^{th}$ occurrence of the event, where M is equal to the number of non-volatile resistive switching memory cells and changing a state of the $M^{th}$ cell of the non-volatile resistive switching memory cells. In addition to the foregoing, the method can also comprise reading a value of the variable count at least in part by adding the number of non-volatile resistive switching memory cells matching a read state of the first bit, wherein the read state of the first bit is defined as a state of the first bit at a time of reading the value of the variable count.

In further embodiments of the present disclosure, provided is a method for counting in non-volatile resistive switching memory. In an embodiment, the method can comprise initiating a count algorithm and initializing a number, M, of non-volatile memory (NVM) cells for storing a portion of a variable count and characterizing one cell of the NVM cells as a primary bit (PB) and another cell of the NVM cells as a final bit (FB). In addition, the method can comprise detecting occurrence of an event associated with the count algorithm, incrementing an interval counter in response to detecting occurrence of the event, detecting an $I^{th}$ occurrence of the event, wherein I is an integer specified by the count algorithm to be greater than one and changing a state of the PB of the NVM cells from an original state to a changed state and resetting the interval counter in response to detecting the $I^{th}$ occurrence of the event. Moreover, the method can comprise detecting a second $I^{th}$ occurrence of the event and resetting the interval counter and changing a second bit of the NVM cells to the changed state and resetting the interval counter. Still further, the method can comprise detecting an $M^{th}$ instance of $I^{th}$ occurrences of the event and resetting the interval counter, where M is equal to the number of NVM cells, changing the FB of the NVM cells to the changed state and reading a value of the variable count at least in part by adding the number, Y, of NVM cells matching a read state of the PB.

According to still further embodiments, disclosed is an integrated circuit device. The integrated circuit device can comprise an array of non-volatile resistive switching memory (ReMEM) cells comprising a plurality of ReMEM cells, wherein a first portion of the plurality of ReMEM cells can include a number, M, of ReMEM cells characterized for non-binary coded decimal (BCD) counting and a second portion of the plurality of ReMEM cells can include a second number, N, of ReMEM cells characterized for BCD counting. The integrated circuit device can further comprise a controller for implementing a monotonic counting algorithm in part in the first portion of the plurality of ReMEM cells and in second part in the second portion of the plurality of ReMEM cells and can comprise counter control circuitry configured to detect an event identified by the monotonic counting algorithm causing the controller to program a first ReMEM cell of the M ReMEM cells. Still further, the integrated circuit device can comprise read circuitry configured to determine a number of the M ReMEM cells having a predetermined program state, determine a count value for the M ReMEM cells in non-BCD format and determine a multiplier value of the N ReMEM cells in BCD format.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of the subject disclosure may be practiced without these specific details, or with other methods, components, materials, etc. In other instances, well-known structures and devices are shown in block diagram form to facilitate describing the subject disclosure.

DETAILED DESCRIPTION

Introduction

Figure 1:
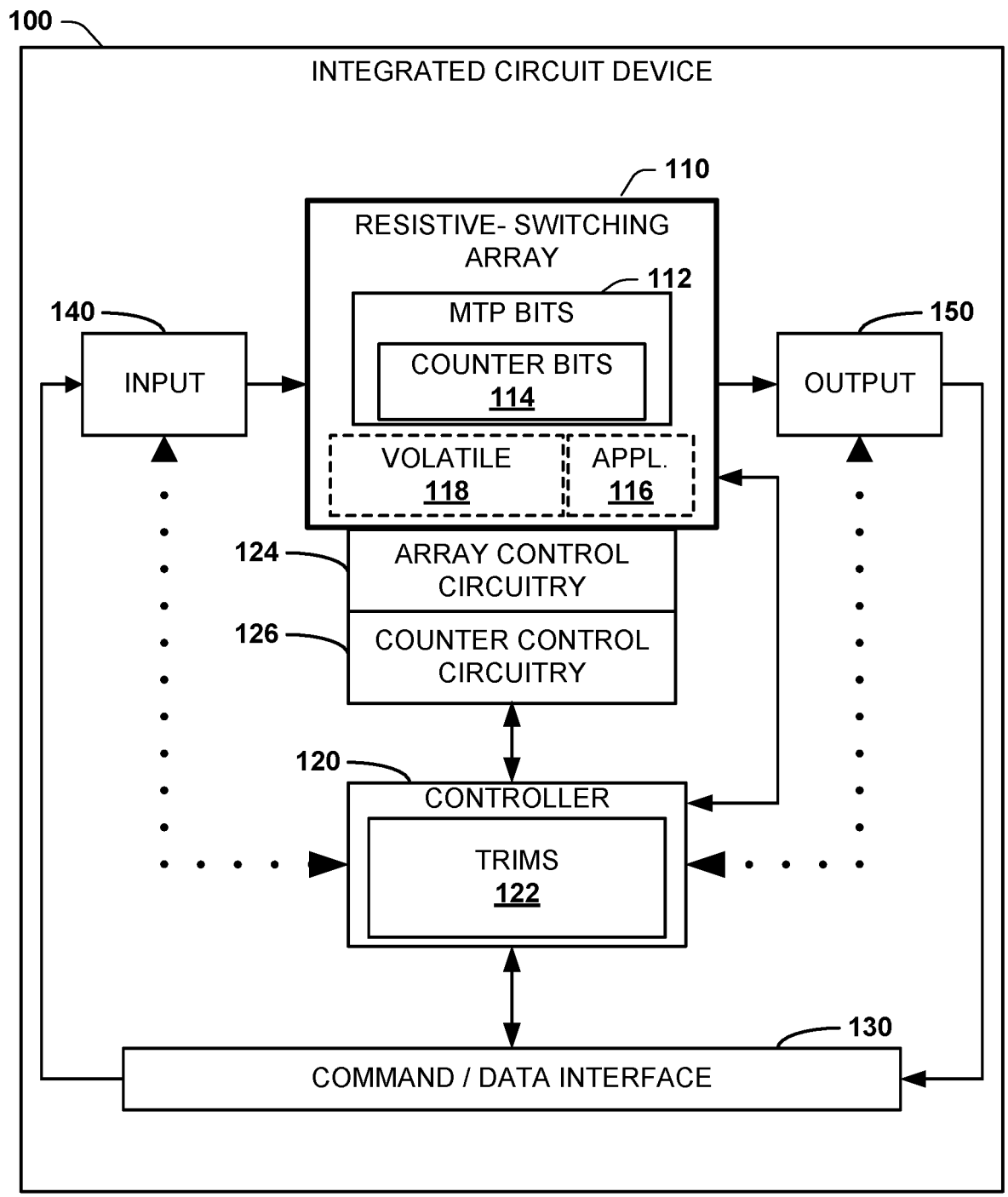
FIG. 1 depicts a block diagram of a circuit device to facilitate a monotonic counter in non-volatile resistive switching memory hardware, in disclosed embodiments.

Aspects of the present disclosure leverage non-volatile resistive switching memory to implement a monotonic counter, wholly or in part within memory hardware in various disclosed embodiments. A process implemented and data stored in hardware can be much more secure than an analogous process and data implemented in software. Software, for example, is often accessible on a network and devices connected to the network. Encryption and firewalls are utilized to protect network connections, but if these are compromised the software might be accessible at any network device, even from the internet for example. In contrast, secure processes implemented in hardware can be insulated from network access. In the latter case, hardware security can limit hacking attempts to those having direct physical access to a hardware device (e.g., resistive switching memory) and in some instances physical dissection of an integrated circuit device can be required to inspect data values stored in hardware memory to effectively compromise the hardware security. To leverage the significant benefits of hardware security, the present disclosure provides a secure mechanism for implementing a monotonic counter wholly or in part within resistive switching memory hardware.

In addition to realizing the security benefits of hardware-implemented processes, disclosed monotonic counters can achieve significant longevity beyond conventional presumptions for non-volatile, scalable hardware. To illustrate, while magnetic storage devices such as disk drives, and optical drives such as digital video drives and the like are non-volatile and can have good longevity, they generally do not approach the scalability of integrated circuit devices. Moreover, they cannot be embedded within a monolithic structure the way that complementary metal oxide semiconductor (CMOS) storage devices can be embedded within a computing system located on a single semiconductor die (e.g., a system on chip). Accordingly, the disk drive is more vulnerable to hacking when physically accessible because compromising the disk drive does not risk destruction of other system circuitry that processed data stored on the disk drive. Illicit access to non-volatile data stored in a monolithic structure together with essential processing, control and management circuitry, on the other hand, risks destruction of the electronic infrastructure necessary to utilize the data, when properly secured. The primary drawback for implementing secure storage in non-volatile integrated circuit devices is the write and rewrite lifespan of such devices (e.g., see FIG. 2, infra). Once the reliable lifespan of a given set of non-volatile integrated circuit memory is reached, a monotonic counter cannot reliably continue counting, rendering that process unusable.

To extend effective longevity of a hardware-implemented monotonic counter, disclosed monotonic counters can utilize, in part or in whole, a non-binary coded decimal (BCD) algorithm. In BCD a least significant bit is changed for every count (e.g., see FIG. 2, infra). As a result, the endurance life of a single bit (the least significant bit) can impose a limit on the effective life of the monotonic counter as a whole. Disclosed non BCD algorithms significantly increase the effective life by non-volatile memory cells utilized to embody the monotonic counters described herein. For instance, in some embodiments many multiples of the endurance life of a given bit can achieved for a disclosed monotonic counter.

Further to the above, the present disclosure provides both a monotonic increase counter and a monotonic decrease counter. A monotonic increase counter can count upward from an initial starting number (e.g., from zero, or a lower number) to a larger number(s). Likewise, a monotonic decrease counter can count downward from a high starting number to a lower number(s).

In further embodiments of the present disclosure, an array of resistive switching memory can be characterized such that a portion of resistive switching memory cells of the array are utilized to implement one or more monotonic counters. Other portions of the resistive switching memory cells can be characterized for other functions or applications, such as generating physical unclonable function (PUF) data or generating random number generation (RNG) data. Suitable memory applications for which portions of an array can be characterized include many-time programmable (MTP) non-volatile data storage, one-time programmable (OTP) non-volatile data storage, and the like (e.g., see FIG. 1, infra).

In mathematical terms a function is a condition or set of conditions that provide an output in response to an input, and in computer-science a one-way function is a function that is computationally difficult to invert. Such functions are useful in cryptography because of the difficulty in mapping the conditions that produce a correct output when given a random input. Generation of data by applying an input to stochastic physical characteristics can also be referred to as a physical unclonable function (PUF) or physically unclonable function (also PUF). PUF can also refer herein to the characteristics themselves as physically unclonable features (also PUF), physical(ly) unclonable features, or other nomenclature, suitable to produce a physical(ly) unclonable function in conjunction with a data generation process. Data derived from such stochastic physical characteristics as an output are referred to herein as PUF data (or a PUF bit, or group of PUF bits, etc.) and generally involve a process applied to one or more integrated circuit devices assigned by a control device to define a PUF bit(s) (e.g., see controller 120 of FIG. 1, infra).

As utilized herein, the term "substantially" and other relative terms or terms of degree (e.g., about, approximately, substantially, and so forth) are intended to have the meaning specified explicitly in conjunction with their use herein, or a meaning which can be reasonably inferred by one of ordinary skill in the art, or a reasonable variation of a specified quality(ies) or quantity(ies) that would be understood by one of ordinary skill in the art by reference to this entire specification (including the knowledge of one of ordinary skill in the art as well as material incorporated by reference herein). As an example, a term of degree could refer to reasonable manufacturing tolerances about which a specified quality or quantity could be realized with fabrication equipment. Thus, as a specific illustration, though non-limiting, for an element of an integrated circuit device expressly identified as having a dimension of about 50 angstroms (Å), the relative term "about" can mean reasonable variances about 50 Å that one of ordinary skill in the art would anticipate the specified dimension of the element could be realized with commercial fabrication equipment, industrial fabrication equipment, laboratory fabrication equipment, or the like, and is not limited to a mathematically precise quantity (or quality). In other examples, a term of degree could mean a variance of +/−0-3%, +/−0-5%, or +/−0-10% of an expressly stated value, where suitable to one of ordinary skill in the art to achieve a stated function or feature of an element disclosed herein. In still other examples, a term of degree could mean any suitable variance in quality(ies) or quantity(ies) that would be suitable to accomplish an explicitly disclosed function(s) or feature(s) of a disclosed element. Accordingly, the subject specification is by no means limited only to specific qualities and quantities disclosed herein, but includes all variations of a specified quality(ies) or quantity(ies) reasonably conveyed to one of ordinary skill in the art by way of the context disclosed herein.

Process techniques for fabricating integrated circuit devices on a semiconductor die can cause physical properties having the stochastic or substantially stochastic characteristics suitable for generating PUF data. For instance, these physical properties can have little or no replication or repetition among fabricated structures made by the same process. As one example, a resistive switching layer(s) of a two-terminal resistive switching device can have variation in thickness that is highly uncorrelated among devices on a die, among portions of an array, or among arrays on the die. This results in random or near-random nano-scale or even angstrom-scale variations in physical characteristics of the switching layer (e.g., layer thickness, layer permeability, atomic-level defects and so forth). As a result, electrical characteristics associated with the resistive switching device can be highly uncorrelated resulting in random variation in response to an electrical stimulus. This variation in response can be leveraged to form a physical unclonable function (PUF) yielding PUF data. Moreover, because any given cell can have such characteristics, a memory cell controller can characterize any sub-portion of an array of resistive switching memory cells for generating PUF data, while characterizing other sub-portions of the array for other functions or applications, such as monotonic counting in hardware, MTP data storage, OTP data storage, RNG data generation, and so forth.

As utilized herein, the term "native", "original", "virgin" or the like refers to post-fabrication but pre-commercial operation of integrated circuit devices on a semiconductor die. Native (and like terminology) need not exclude some or all post-fabrication operations such as quality testing or other verification routines performed by a manufacturer, and even some pre-commercial operation by a non-manufacturer such as testing to ensure manufacturer quality specifications are met by a chip, chip setup routines or configuration routines, among others. In general, a resistive switching device is in a native state, as utilized herein, if it has not yet received a stimulus (e.g., electrical, thermal, magnetic, or a like stimulus known in the art, suitable combinations thereof, and so forth) suitable to form a conductive channel region within a switching region of the resistive switching device and change the resistive switching device from an electrically resistive state to an electrically conductive state as described herein or known in the art.

Overview

FIG. 1 illustrates a block diagram of an example integrated circuit device 100 for an electronic device according to one or more embodiments of the present disclosure. Integrated circuit device 100 includes a resistive switching array 110 comprising a two or three dimensional arrangement of non-volatile two-terminal resistive switching memory cells. Examples of two-terminal resistive switching memory cells can include: filamentary resistive switching memory (ReMEM), resistive random access memory (RRAM®), phase change memory (PCRAM), conductive-bridging memory (CBRAM®), programmable metallization cell memory (PMC), as well as magnetic memories such as magneto resistive memory (MRAM), spin torque transfer magneto resistive memory (STT-MRAM), vertical transport magneto resistive memory (VMRAM), ferroelectric memory (FeRAM), or other suitable two-terminal charge storage memory(ies). Where suitable to one of ordinary skill in the art, the foregoing memory technologies, similar memory technologies, or suitable subsets thereof are considered within the meaning of two-terminal resistive switching memory for one or more embodiments of the present disclosure.

A controller 120 is provided to select subsets (e.g., one or more) of resistive switching array 110 for electronic operations. Controller 120 can utilize row and column selection circuitry (including multiplexers; see FIG. 13, infra) and processes associated with implementing electrical operations, processing operations, computing operations, memory operations, or the like, on resistive switching devices (e.g., FIGS. 13 and 14, infra), and utilize those circuitries and processes for performing a monotonic counting application, in various disclosed embodiments. Such selection and processing circuitry can be incorporated within array control circuitry 124.

When embodied in an array (e.g., see FIGS. 6, 7 and 13, infra), controller 120 can be coupled to array control circuitry 124 to select one or more resistive switching devices for a monotonic counting operation. In some embodiments, controller 120 can be configured to implement electronic or memory operations on subsets of resistive switching array 110 provided for applications 116. Subsets characterized for applications 116 can include a PUF operation configured for generating one or more PUF data bits, a RNG operation or generating random data, a program, read or erase operation for MTP data storage applications, a write or read operation for OTP data storage applications, among others. Instructions for implementing the foregoing can be stored in trim instructions 122. Such instructions can specify a number of resistive switching devices to allocate to a monotonic counter application(s), a signal indicative of a detected event resulting in updating a count, an arrangement of resistive switching devices for counter bits, a second arrangement of resistive switching devices for base multiplier bits and in some disclosed embodiments an implementation for interval bits. Interval bits can be implemented in software in some embodiments (e.g., volatile resistive switching memory devices 118 within resistive switching array 110, in an embodiment, or other volatile memory such as SRAM, DRAM or the like—not depicted, but see FIG. 14, infra) or can be implemented in non-volatile resistive switching memory devices such as MTP bits 112 in alternative embodiments.

Figure 6:
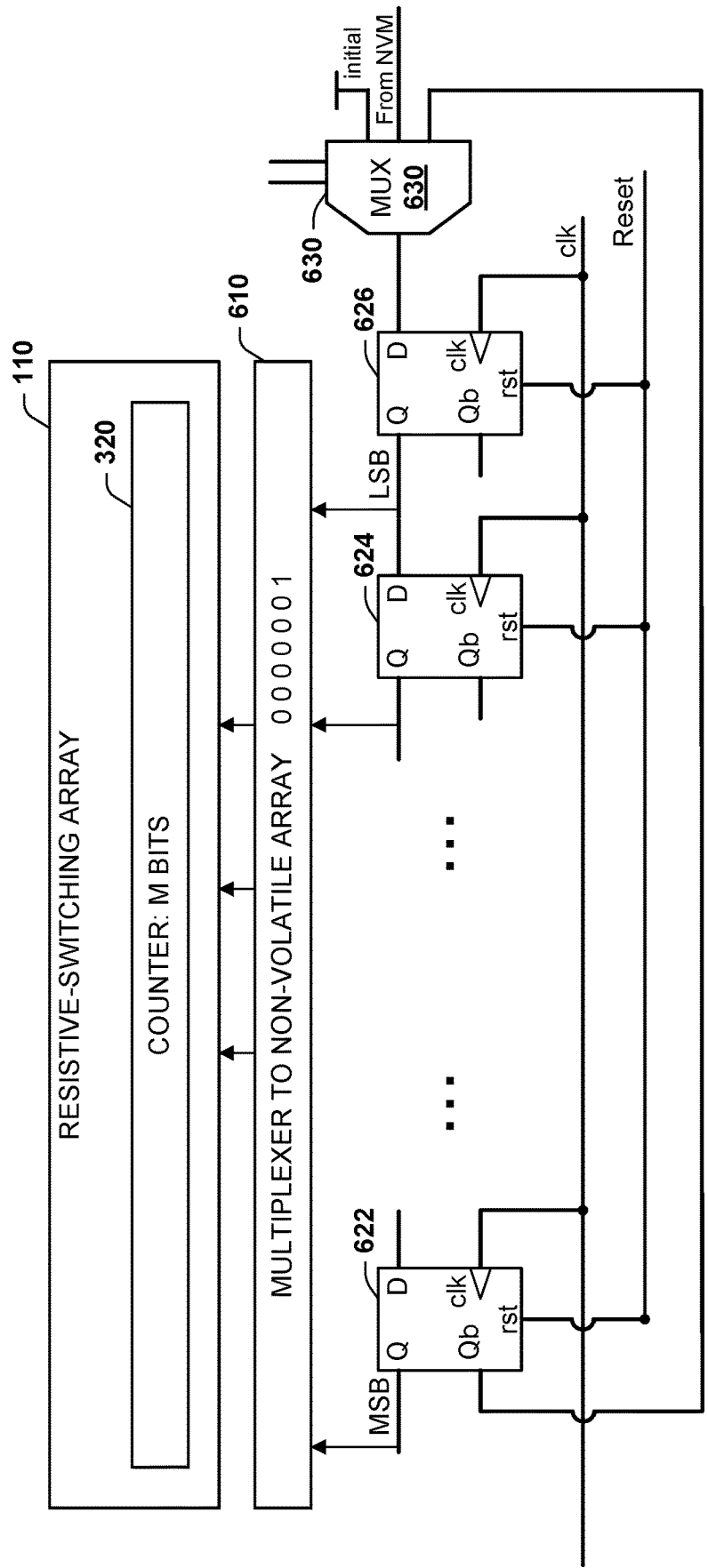
FIG. 6 illustrates an example control circuit for implementing a monotonic counter in non-volatile resistive switching memory hardware, in other embodiments.
Figure 7:
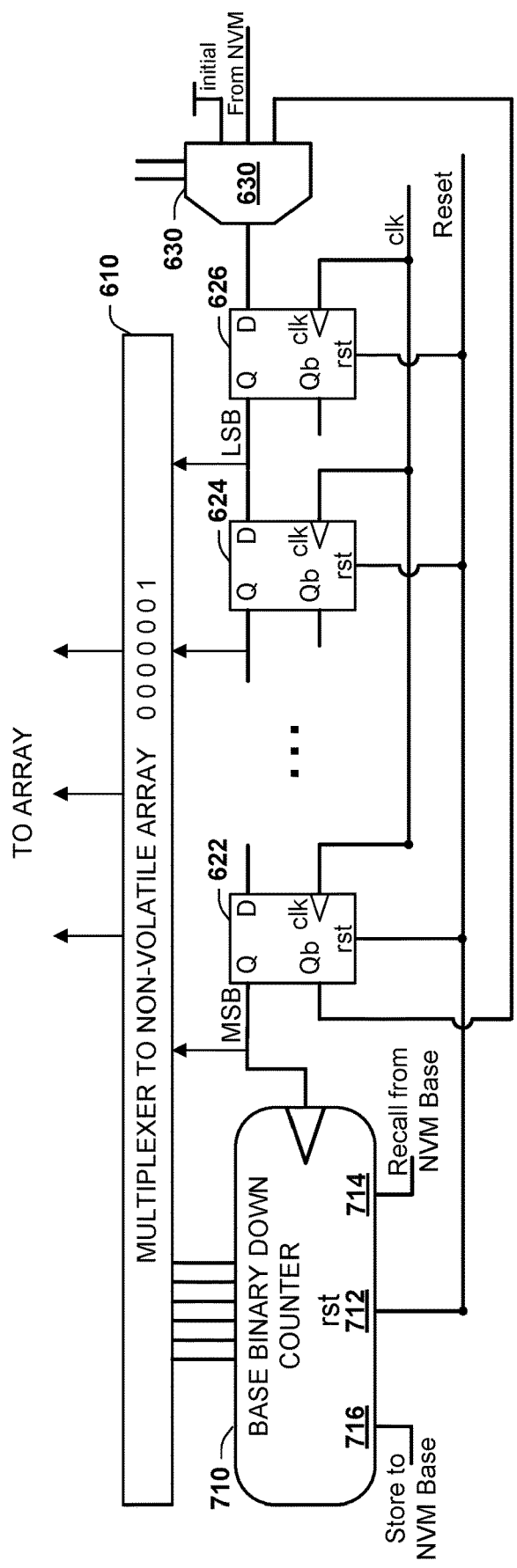
FIG. 7 depicts an example control circuit for implementing a monotonic counter in non-volatile resistive switching memory hardware in further embodiments.

Counter control circuitry 126 can be provided to control implementation of a counting algorithm to the resistive switching memory cells embodying a monotonic counter (e.g., see FIGS. 6 and 7, infra). Such memory cells can include the counter bits, base multiplier bits or interval bits, or suitable combinations of the foregoing.

Also illustrated in integrated circuit device 100 is an input(s) 140 and output(s) 150. In some embodiments, input(s) 140 can include (or provide a pathway for) data to be stored within resistive switching array 110. Output(s) 150 can output data stored within and retrieved from resistive switching array 110 by controller 120. In some embodiments, output(s) 150 can output acknowledgment data, count data, or response data indicative of a function associated with count data (e.g., a comparison of a current count to a number) for a monotonic counter implemented in resistive switching memory cells of resistive switching array 110. In other embodiments, output(s) 150 can output acknowledgment data that results from computations utilizing PUF data generated from a PUF operation, such as successful cryptographic key match for a cryptography application or identity match for an identifier application, or other suitable security function suitable for use with generated PUF data.

A command/data interface 130 is provided to receive commands (e.g., application-related commands, memory commands, cryptography commands, identification commands, etc.) from an external device and respond to those commands. As one example, a signal indicating detection of an event associated with increasing (or decreasing) a count embodied by a monotonic counter implemented in resistive switching array 100 can be received over command/data interface 130. In yet another example, a condition qualifying as such an event can be received over command/data interface 130 and detected as such an event by controller 120. In addition to the foregoing, data to be written to resistive switching array 110 can be received by way of command/data interface 130, and data output from resistive switching array 110 can be provided over command/data interface 130. In at least some embodiments, controller 120 can dynamically expose resistive switching array 110 to an external host device (separate from integrated circuit device 100—not depicted) by way of command/data interface 130. In such embodiments the external host device can select subsets of resistive switching array 100 for implementing an application, a data operation, a memory operation, or the like. In various example implementations, the external host device can be manufactured separately and communicatively interconnected by one or more network or device interfaces to command/data interface 130 to accomplish this embodiment (s).

Figure 2:
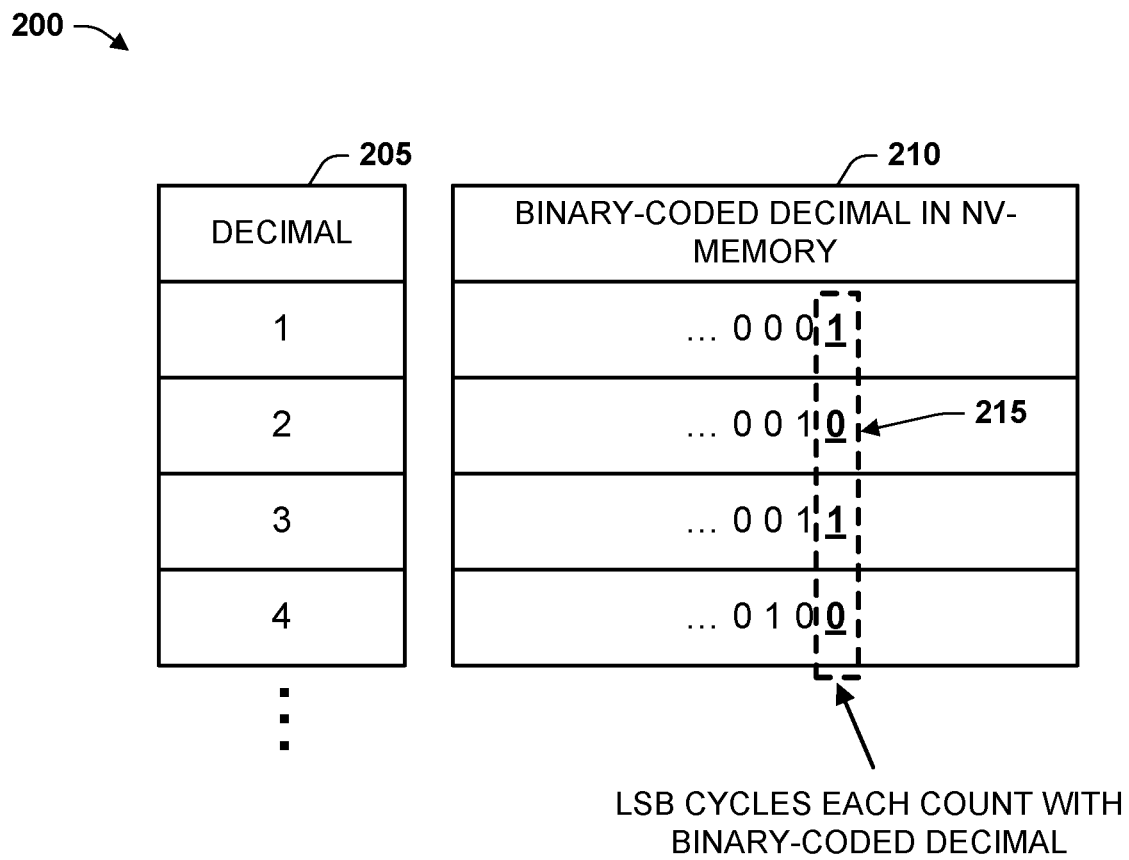
FIG. 2 illustrates a block diagram of an example counter implemented in binary-coded decimal (BCD) format in one or more embodiments.

FIG. 2 illustrates an example binary coded decimal (BCD) implementation 200 in non-volatile resistive switching memory cells, in various embodiments of the present disclosure. BCD implementation 200 correlates a decimal number 205 with an associated binary number 210. The binary number 210 includes a resistive switching memory cell associated with each bit of a binary coded decimal number. Specifically, the example in FIG. 2 includes a 4-bit binary number 210 including a least significant bit 215 as well as a most significant bit, second-most significant bit and second-least significant bit as is understood for BCD encoding.

As shown, the decimal number 205 "1" is represented by a binary number "0001", the decimal number 205 "2" is represented by binary number "0010", and so on. As is shown by BCD implementation 200, the least significant bit 215 changes for each change in decimal number 205. Accordingly, a monotonic counter implemented in BCD implementation 200 will result in a program or erase event for least significant bit 215 for every change in decimal number 205. A life cycle or endurance life of least significant bit 215 therefore limits a size of number that can be counted with BCD implementation 200 because new numbers cannot be embodied by the binary number 210 once least significant bit 215 can no longer reliably switch from a '0' to a '1', or from the '1' to '0'. Thus, the total capacity or largest number that can be counted with BCD implementation 200 is limited to the endurance life of least significant bit 215.

Figure 3:
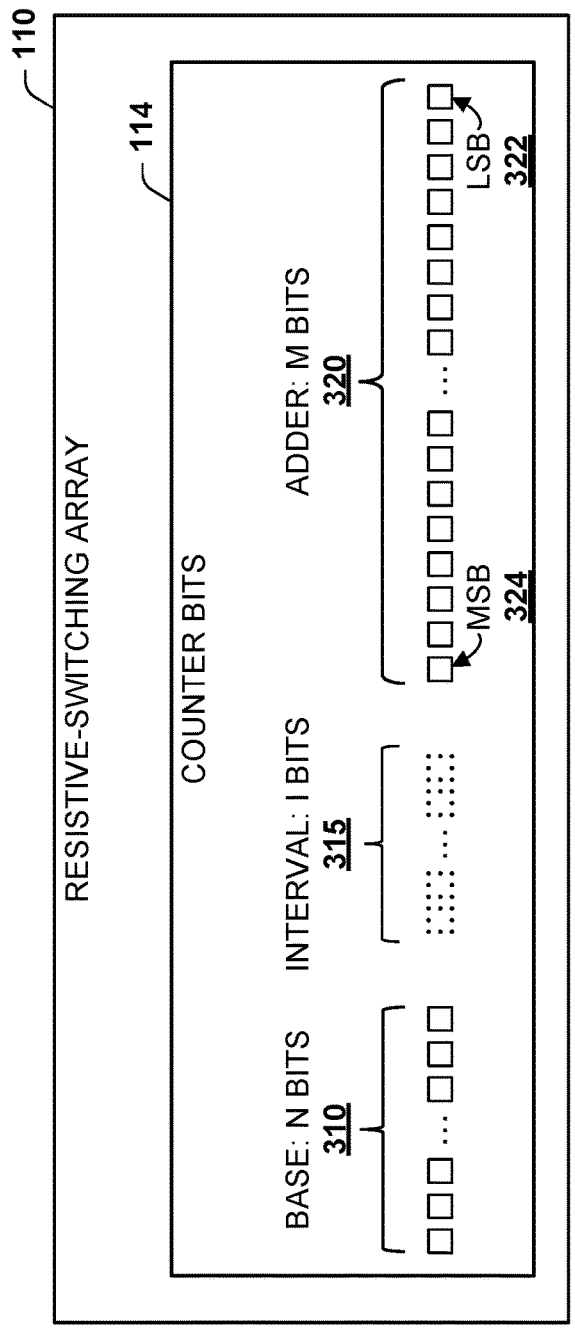
FIG. 3 depicts a diagram of an example allocation of non-volatile memory cells for a disclosed monotonic counter according to further embodiments of the present disclosure.

FIG. 3 illustrates a bit arrangement 300 for a monotonic counter according to alternative embodiments of the present disclosure. Bit arrangement 300 is in part or in whole embodied by counter bits 114 of resistive switching array 110. More specifically, counter bits 114 are resistive switching devices characterized for MTP operation.

As shown, counter bits 114 can include M bits 320 denoted as adder bits (320). M bits 320 are controlled by a non-BCD counting algorithm in various disclosed embodiments (e.g., by controller 120 of FIG. 1, supra). A least significant bit (LSB) 322 and most significant bit (MSB 324) are identified to denote endianness with respect to storing M bits 320 in specific locations of resistive switching array 110. This enables an unambiguous location reference for each bit of M bits 320 in resistive switching array 110, but does not denote any difference in mathematical power (e.g., binary power: $2^{Bit}$). Rather, LSB 322 (a little endian) and MSB 324 (a big endian) have the same mathematical power corresponding to a single decimal number (e.g., see FIGS. 4A and 5A, infra). Thus, LSB 322 and MSB 324 can be named according to a different naming convention, such as first bit and last bit, primary bit and trailing bit, or other suitable differentiating nomenclature. For ease of reference, however, LSB 322 and MSB 324 are used hereinafter according to the above definition.

In addition, counter bits 114 can include base multiplier bits 310, also referred to herein as base bits 310. In the example of FIG. 3, N base bits 310 are provided. Base multiplier bits 310 are stored in separate resistive switching memory cells of resistive switching array 110 from the M adder bits 320. In one or more embodiments, multiplier bits 310 can correspond to a BCD number system, contrary to the M adder bits 320.

Still further, counter bits 114 can optionally include one or more interval (I) bits 315. Interval bits 315 are shown in dashed squares in FIG. 3 to indicate their optional allocation within counter bits 114 of resistive switching array 110. For instance, interval bits 315 can be implemented in volatile memory of resistive switching array 110 (e.g., volatile resistive switching memory cells of resistive switching array 110) or can be implemented in volatile memory external to resistive switching array 110, such as SRAM, DRAM or the like (e.g., see volatile memory 1410A of FIG. 14, infra). When implemented in volatile memory, interval bits 315 can be controlled by software processed by controller 120, controlled by a processor together with controller 120 (e.g., processing unit 1404 of FIG. 14), or a suitable combination of the foregoing (e.g., controller 120 can expose resistive switching array 110 or at least counter bits 114 to control by processing unit 1404 through command/data interface 130, input(s) 140 and output(s) 150). In at least some embodiments, however, interval bits 315 can also be implemented in non-volatile resistive switching memory cells of resistive switching array 110.

Figure 4:
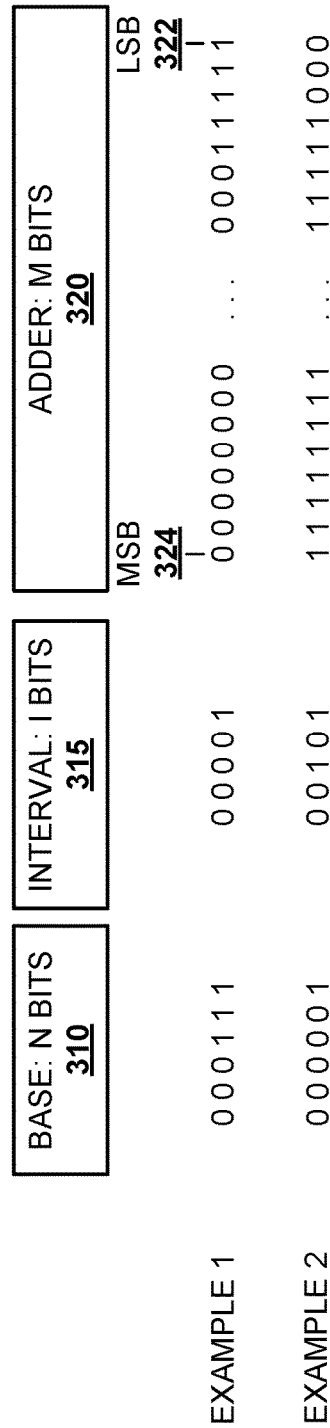
FIG. 4 depicts a diagram of an example monotonic increase counter implemented in part in a non-BCD format in still further embodiments of the present disclosure.

FIG. 4 illustrates an example non-BCD monotonic increase count algorithm 400 according to one or more embodiments of the present disclosure. Algorithm 400 defines M adder bits 320 as a non-BCD number, and N base multiplier bits 310 as well as I interval bits 315 as BCD numbers.

In various disclosed embodiments, M adder bits 320 represent a decimal number according to the following non-BCD numbering convention. Each qualifying event (e.g., detected by controller 120, or notified to controller 120, as suitable) to be counted results in a change in a different bit of M adder bits 320, starting with LSB 322. The number zero (events) is represented by all M adder bits 320 storing a '0' value associated with a default program state (e.g., unprogrammed, or high resistance state). In response to a countable event, LSB 322 is changed to '1' (e.g., by controller 120, processing unit 1404, or the like), and in response to a second event a bit adjacent to LSB 322, or a second-least significant bit (immediately to the left of LSB 322 according to the arrangement in FIG. 4) is changed to '1'. Notably, LSB 322 does not change in response to the subsequent event. In response to a $M-1^{th}$ event a second-most significant bit is changed to '1' (LSB 322 again does not change) and in response to a $M^{th}$ event MSB 324 is changed to '1'. Thus, following M detected events each of M adder bits 320 store a '1'.

In addition to the foregoing, following each multiple of M detected events the N base multiplier bits 310 are incremented by one. For example, in response to the $M+1^{th}$ detected event the N base multiplier bits 310 are changed from zero to one (1), along with LSB 322 being reset to a '0' (e.g., a non-program state). In an embodiment, N base multiplier bits 310 are represented in BCD format. Accordingly, following the $M+1^{th}$ detected event N base multiplier bits 310 are incremented to: . . . 0 0 0 0 0 1 (e.g., as shown by example 2 of FIG. 4). Subsequent multiples of M detected events further increment a value of N base multiplier bits 310.

Following the $M^{th}$ count, respective adder bits can be changed from 1 to 0 for each detected event, also called being reset. In the (non-limiting) examples shown by FIG. 4 the LSB 322 is changed from '1' to '0' following an $M+1^{th}$ event (e.g., see example 2). An $M+2^{nd}$ event results in a second least significant bit being changed from '1' to '0', and so on. A $2*M-1^{th}$ event results in a second most significant bit being changed from '1' to '0' and a $2*M^{th}$ event results in MSB 324 being changed from '1' to '0' as well. In general, each countable event results in change of a different one of M adder bits 320, starting from LSB 322 progressing to MSB 324, and restarting again at LSB 322. Other conventions are within the scope of the present disclosure, however, such as starting with MSB 324 and progressing to LSB 322, starting with LSB 322, progressing to MSB 324 and progressing backward from MSB 324 to LSB 322 again, or the like.

Further to the above, following a second $M^{th}$ detected event (2 times M events, or M multiplied by 2 total events) the N base multiplier bits 310 can be incremented a second time in response to the $2*M+1^{th}$ event to: . . . 0 0 0 0 1 0 (in BCD). Subsequent multiples of M detected events result in a further increment to the N base multiplier bits 310 accordingly. It should be appreciated that N base multiplier bits 310 can optionally be implemented in a non-BCD numbering system in one or more alternative embodiments. The non-BCD numbering system can be the same as that described for M adder bits 320, or a different non-BCD numbering system.

Interval I bits 315 can be implemented in some disclosed embodiments to enable multiple event-counts per update to M adder bits 320. Described differently, the interval I bits 315 can define a fixed number of events required to be detected for each increment to M adder bits 320. This allows for a further multiple of the M adder bits 320 relative to countable events in addition to that provided by N base multiplier bits 310 as described above. Moreover, interval I bits 315 can correspond to some monotonic counting applications requiring a count to be implemented only for each interval number of detected events. In the first example 1 illustrated in FIG. 4, interval I bits 315 define a number '1', and so M adder bits 320 are incremented for every one qualifying event. In the depicted example 2, in contrast, interval I bits 315 define a binary number '5', and so the M adder bits 320 are incremented for every five qualifying events, rather than each qualifying event as for example 1. A current value of interval I bits 315 can be maintained (and incremented and reset) in software, in some embodiments, or can be maintained in separate resistive switching memory cells of resistive switching array 110 allocated to interval I bits 315.

A current count for a monotonic counter of algorithm 400 is defined by the following relationship:

$$CV=V_I\times(M\times V_N+V_M)$$

where CV is the current count, $V_I$ is a defined fixed number for the interval I bits 315, M is a defined fixed number of M adder bits 320 utilized for the adder bits (including LSB 322, MSB 324 and bits there between), $V_N$ is a value of the N base multiplier bits 310 and $V_M$ is a (current) value of the M adder bits 320. In an embodiment where no interval I bits 315 are employed $V_I$ is set to one and $CV=(M\times V_N+V_M)$. In an embodiment where no N base multiplier bits 310 are employed $V_N$ can also be set to zero, and in such embodiment $CV=V_I\times V_M$.

As introduced above and briefly reiterated here: the count of M adder bits 320 begins at zero with all M adder bits 320 having a '0' state. A value of $V_M$ is determined by the current number of M adder bits 320 having the same program state as LSB 322, and will have a value between 1 and M (the number of M adder bits). To illustrate: where only LSB 322 is programmed to '1' and all other M adder bits are '0', then $V_M=1$. Likewise, where only LSB 322 is '0' and all other M adder bits are '1', $V_M$ is also =1. For example 1 shown in FIG. 4: LSB 322 is '1' and four additional M adder bits 320 are also '1', and thus $V_M=5$. In example 2, three bits (total) have the same value '0' as LSB 322 and thus $V_M=3$ in example 2. In addition, algorithm 400 increments a value $V_N$ of N base multiplier bits 310 upon detecting a $M+1^{th}$ count and also resets LSB 322 to a default state (e.g., a non-program state). Each multiple of M counts results in a further increment to $V_N$ and a change to LSB 322 upon the following count.

To calculate CV at any given count, the above relationship is used for a value of $V_I$ and a fixed number M of M adder bits 320. Where $V_I=1$ and M=128 example 1 of FIG. 4 defines $CV=1\times(128\times7+5)$ or 901. For the same values of $V_I$ and M, example 2 of FIG. 4 defines $CV=5\times(128\times1+3)$ or 655.

Figure 4A:
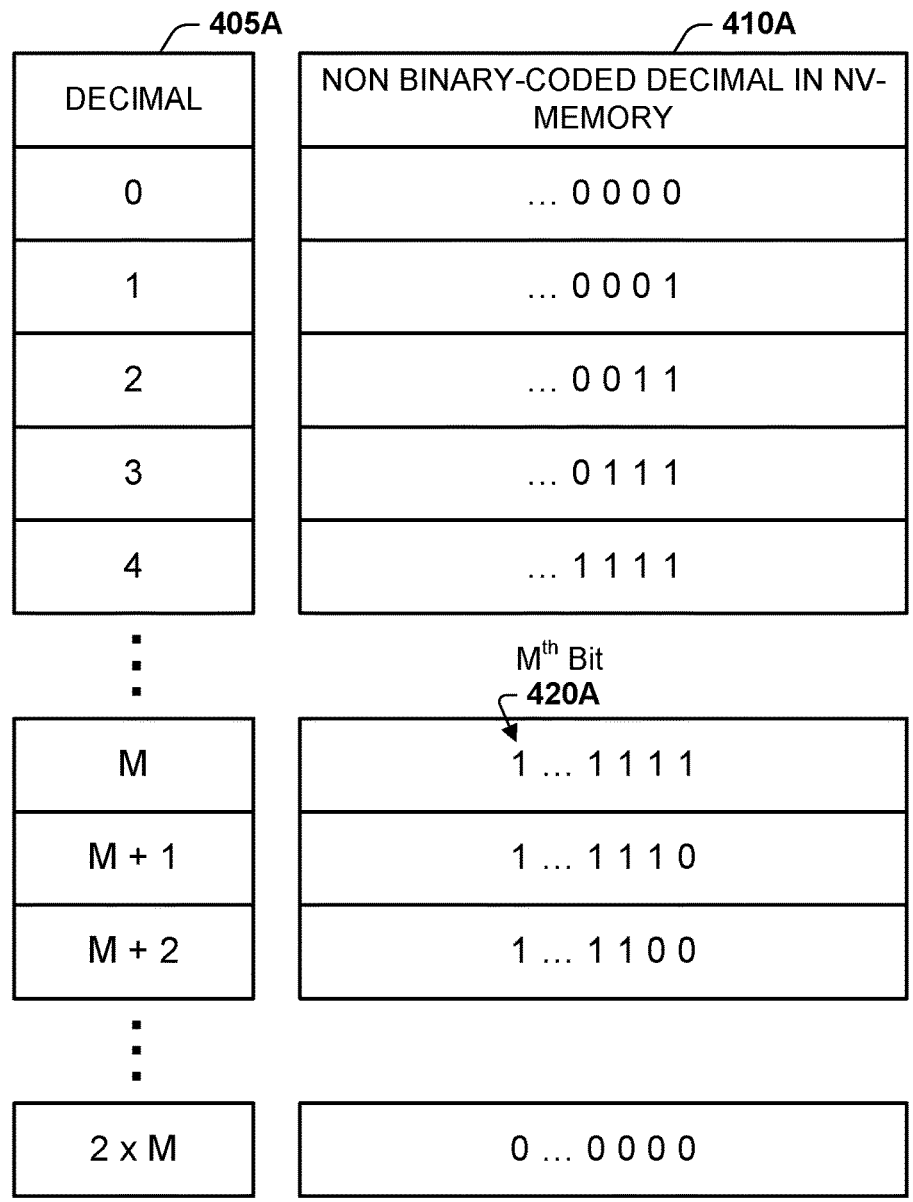
FIG. 4A illustrates a sample count of the monotonic increase counter of FIG. 4 in further aspects of the disclosed embodiments.

FIG. 4A illustrates an example non-binary count 400A of M adder bits 320 according to algorithm 400 in one or more aspects of the disclosed embodiments. Non-binary count 400A provides a table with a decimal column 405A adjacent a non-binary coded decimal (non-BCD) column 410A. The table maps decimal interval values in decimal column 405A to a non-BCD digital format utilized for algorithm 400. The non-BCD digital format stored in non-BCD column 410A can be stored in non-volatile resistive switching memory (e.g., resistive switching array 110 of FIG. 1, supra). While non-BCD column 410A is shown with 4 (or 5) bits, it should be understood that this is illustrative only and any suitable number of bits can be utilized for M adder bits 320, such as 32, 64, 128, 256 . . . 1024, 2048, 4096, . . . and so on. In some embodiments, the number of bits can be non-powers of 2, such as 50 bits, 125 bits, 180 bits, 270 bits, 330 bits, 500 bits, 850 bits, and so on.

Starting from the top, decimal value 0 corresponds with 0 0 0 0. Decimal value 1 maps to 0 0 0 1 where a right-most bit is changed from 0 to 1, and decimal value 2 maps to 0 0 1 1 where a second right-most bit is changed from 0 to 1, and the right-most bit (and other bits) are not changed. As the table continues to larger decimal numbers, decimal number 3 corresponds to 0 1 1 1 and decimal number 4 corresponds to 1 1 1 1. Non-binary count 400A next shows an $M^{th}$ decimal value where an $M^{th}$ bit 420A is changed from 0 to 1 and is shown as 1 . . . 1 1 1 1, with any suitably desired number of bits there between. The non-BCD digital format shown by non-binary count 400A changes only a single bit for each count, spreading out the switching frequency among all M adder bits 320 and enhancing longevity of each bit individually compared to BCD counting in which the least significant bit changes every count.

For counts exceeding a value of M, a bit value can be changed back to '0' starting with the right-most bit. Thus, for a binary value of M+1 the non-BCD value is 1 . . . 1 1 1 0, changed from 1 . . . 1 1 1 1. Subsequent decimal integers change adjacent bits from 0 to 1 as well. Thus, M+2 corresponds to 1 . . . 1 1 0 0 and 2×M corresponds to 0 . . . 0 0 0 0. Subsequent multiples of M decimal values are again represented by change in program state of the right-most bit. As described above, a base multiplier bit $V_N$ can be incremented for each M counts.

Figure 5:
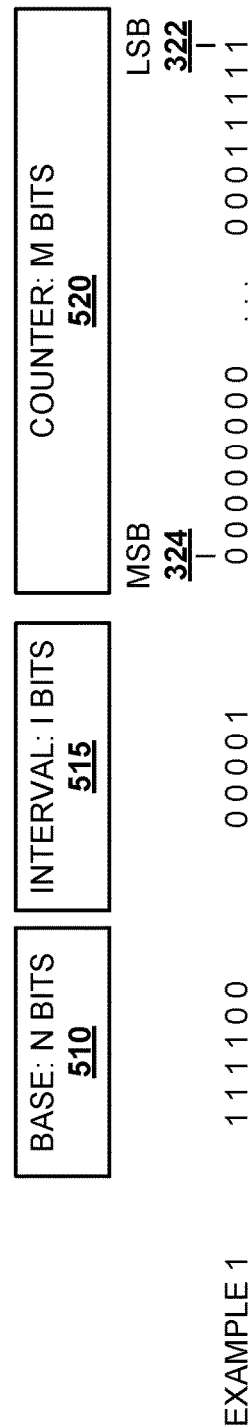
FIG. 5 depicts a diagram of an example monotonic decrease counter implemented in part in a non-BCD form in yet another embodiment(s)

FIG. 5 depicts an example algorithm 500 for a monotonic decrease counter according to further embodiments of the present disclosure. Algorithm 500 can be in part a non-BCD algorithm as described herein. Particularly, algorithm 500 includes counter M bits 520 used for non-BCD counting, base N bits 510 for storing multiple counts of the counter M bits 520, and optionally interval I bits 515 for defining a number of events required to increment the counter M bits 520. The monotonic decrease counter of algorithm 500 is initiated by setting all values of counter M bits 520 and base N bits 510 to '1', or a programmed state. For each detected qualifying event (or interval number of such events) counter M bits is decremented by one. For the example algorithm 500 illustrated by FIG. 5, with interval I bits 515 defined as 1, a first event results in MSB 324 being changed from '1' to '0'. A second event causes a next most significant bit (e.g., $M-1^{th}$ bit) to also be changed from '1' to '0'. This continues for subsequent qualifying events, until an $M-1^{th}$ event results in a second least significant bit to be changed from '1' to '0'.

In a first embodiment, and in response to an $M^{th}$ qualifying event, LSB 322 is also changed from '1' to '0' (see also FIG. 5B, infra) resulting in all counter M bits 520 being in the '0' state. After an $M+1^{th}$ event MSB 324 is changed from '0' to '1' and algorithm 500 can decrement a value of base N bits 510; i.e., algorithm 500 subtracts 1 from base N bits 510. Decrease counting can continue by changing subsequent counter M bits 520 to match MSB 324 following subsequent qualifying events (e.g., FIG. 5B).

In an alternative embodiment, in response to the $M^{th}$ qualifying event LSB 322 is maintained in the '1' state and all other bits from the second least significant bit through MSB 324 are changed back to the '1' state to match LSB 322. In addition, algorithm 500 can subtract 1 from base N bits 510 in response to the $M^{th}$ qualifying event (e.g., see FIG. 5A, infra).

Following multiples of M events base N bits 510 are decremented by one. Thus, an $M^{th}$ event or $M+1^{th}$ event, depending on embodiment, results in a least significant bit of the base N bits 510 being decremented from 1 1 1 1 1 1 to 1 1 1 1 1 0. Subsequent qualifying events are recorded at counter M bits 520 as described herein until a second multiple of M events is determined, and base N bits 510 is further decremented by one. The count value CV of algorithm 500 is defined by the following relationship:

$$CV=V_I \times (M \times V_N + V_M)$$

Where CV is the current count, $V_I$ is a defined fixed number for the interval I bits 515 (1 in the example showed in FIG. 5), M is a defined fixed number of bits utilized for the counter M bits 520 (including LSB 322, MSB 324 and bits there between), $V_N$ is a (current) value of the base N bits 510 and $V_M$ is a (current) value of the counter M bits 520. Similar to algorithm 400, $V_N$ (and $V_I$) is a BCD number and $V_M$ is the integer number of bits matching the bit state of LSB 322 (optionally with the exception of all bits being '0', in which case $V_M$ can also have a value of zero in the embodiment of FIG. 5B, infra). For the example shown in FIG. 5, assuming the number of M bits is 128, CV=1×(128× 60+5)=7685.

Figure 5A:
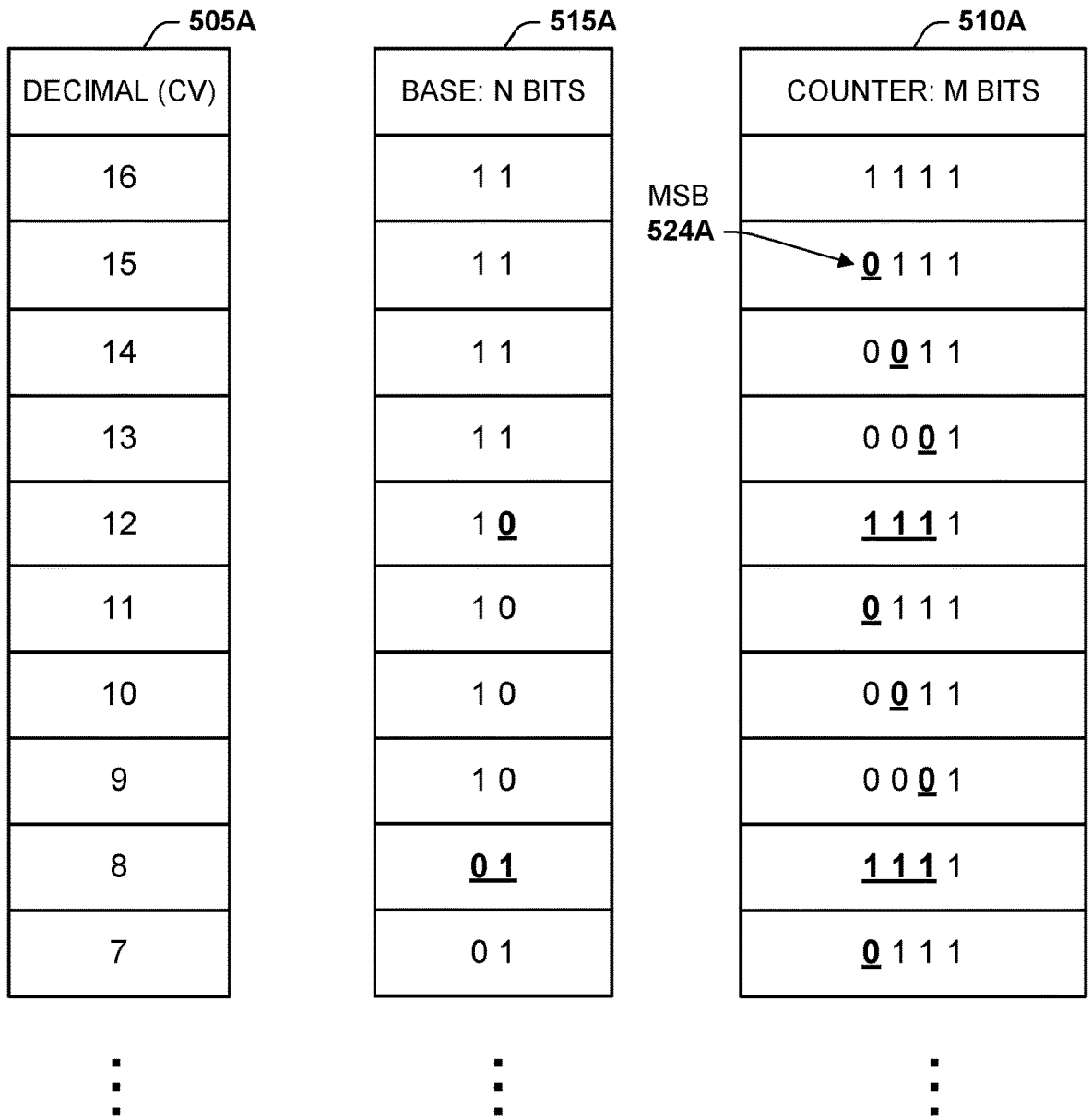
FIG. 5A illustrates a sample count of the monotonic decrease counter of FIG. 5 in yet other aspects of the present disclosure.

FIG. 5A illustrates an example non-binary count 500A of counter M bits 520 according to algorithm 500 in one or more aspects of the disclosed embodiments. Non-binary count 500A provides a table with a decimal column 505A (or count value CV from FIG. 5) adjacent a base N bits 515A (in BCD) column 515A and a counter M bits (in non-binary coded decimal (non-BCD)) column 510A. The table maps decimal interval values in decimal column 505A to a (partially) non-BCD digital format utilized for algorithm 500 represented by base N bits 515A and counter M bits 510A as defined by algorithm 500. The non-BCD digital format stored in counter M bits 510A can be stored in non-volatile resistive switching memory (e.g., resistive switching array 110 of FIG. 1, supra). While counter M bits 510A is shown with 4 bits and base N bits 515A shown with 2 bits, it should be understood that this is illustrative only and any suitable number of bits can be utilized for counter M bits 520, such as 32, 64, 128, 256 . . . 1024, 2048, 4096, . . . and so on. Likewise, base N bits 515A is not limited to 2 bits but can be other suitable numbers of bits. In some embodiments, the number of bits for counter M bits 520A or base N bits 515A can be non-powers of 2, such as 50 bits, 125 bits, 180 bits, 270 bits, 330 bits, 500 bits, 850 bits, and so on.

Starting from the top, decimal value 16 corresponds with 1 1 1 1 counter M bits 510A and 11 base N bits 515A. Utilizing algorithm 500: $CV=V_I \times (M \times V_N + V_M)$ as defined above, we obtain CV=1×(4*3+4) or 16. Decimal value 15 maps to counter M bits 510A 0 1 1 1 where a most significant bit (MSB 524A) is changed from '1' to '0' (CV=1×(4*3+3)=15), and decimal value 14 maps to 0 0 1 1 where a second-most significant bit is changed from '1' to '0' (CV=1×(4*3+2)=15), and the MSB 524A (and other bits) is not changed. As the table continues to count downward, decimal number 13 corresponds to counter M bits 510A of: 0 0 0 1.

For the non-binary count 500A depicted by the embodiment of FIG. 5A, decimal number 12 corresponds to an $M^{th}$ event in which counter M bits 510A are reset to '1's: 1 1 1 1 ($V_M$=4) and base N bits 515A are concurrently decremented by one to 1 0 ($V_N$=2). CV=1×(4*2+4)=12. Non-binary count 500A can continue as shown. The (partially) non-BCD digital format shown by non-binary count 500A changes only a single bit for most counts, with the exception only of the $M^{th}$ count, spreading out the switching frequency among all counter M bits 510A and enhancing longevity of each bit individually compared to BCD counting in which the least significant bit changes every count.

For counts exceeding a value of M, a bit value can be changed back to '0' starting with the MSB 524A. Thus, for a decimal value of 11 the non-BCD value of counter M bits 510A is 0 1 1 1. Subsequent decimal integers change adjacent bits from 1 to 0 as well. Thus, 10 corresponds to counter M bits 510A of 0 0 1 1, and so on. Subsequent multiples of M decimal values (in this case 4, but any suitable value in other examples) are again accompanied by a decrement in base N bits 515A, reducing $V_N$ by one in BCD format.

Figure 5B:
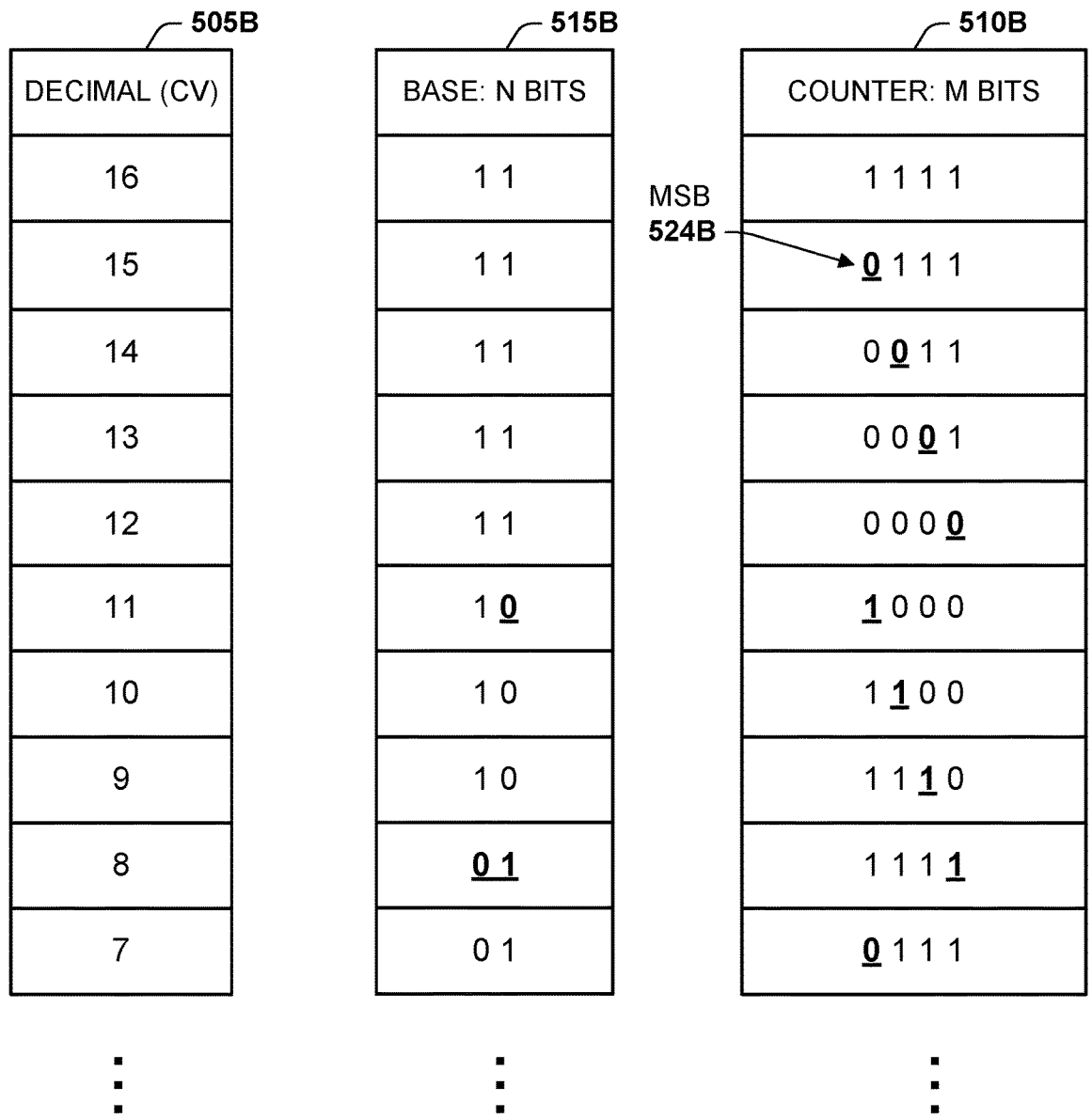
FIG. 5B illustrates a diagram of an alternate example count of the monotonic decrease counter of FIG. 5 in still further disclosed aspects.

FIG. 5B depicts a non-binary count 500B for implementing algorithm 500 according to an alternative embodiment of the present disclosure. Non-binary count 500B maps decimal values (CV) 505B in a first column to associated base N bits 515B ($V_N$ in BCD format) and counter M bits 510B: $V_M$ in a non-BCD format corresponding to algorithm 500. Similar to non-binary count 500A, four bits are utilized for counter M bits, and thus the fixed value of M is equal to four for purposes of this illustration. However, non-binary count 500B is by no means limited to this illustration and any suitable value of bits can be employed for counter M bits 510B (and the value of M) as well as base N bits 515B. Note that, as described below, the value of $V_M$ for non-binary count 500B has one exception to the general rule defined herein, that $V_M$=a number of bits having a same value or program state as the least-significant bit. For non-binary count 500B this rule is true except when all counter M bits 510B are '0'. In this case, the current value of counter M bits 510B is also 0.

Decimal value 16 corresponds to an initial state of counting with base N bits 515B set to 1 1 and counter M bits 510B likewise set to 1 1 1 1 (CV=1×(4*3+4)=16). In response to an event, MSB 524B is changed from '1' to '0', decrementing CV by one to a value of 15 (CV=1×(4*3+3)=15). Following a second event, counter M bits 510B are changed to 0 0 1 1 as shown, and CV=14 (CV=1×(4*3+2)=14).

Similarly in response to a subsequent event, counter M bits 510B become 0 0 0 1 and CV=13 (CV=1×(4*3+1)=13). In response to an $M^{th}$ event, counter M bits 510B are changed to 0 0 0 0, and the exception to $V_M$ generally defined herein is implemented. For non-binary count 500B $V_M$=0 for all counter M bits 510B being in the '0' state, and CV=1×(4*3+0)=12. Following an $M+1^{th}$ event, MSB 524B is changed to '1' from '0' and base N bits are decremented by 1 to 1 0. $V_M$ now =3 (since the exception of all '0's is not true) and thus CV=1×(4*2+3)=11. Non-binary count 500B can continue as shown.

FIG. 6 depicts example non-volatile memory monotonic counter circuitry 600 according to still further embodiments of the present disclosure. Monotonic counter circuitry 600 can comprise a multiplexer 610 communicatively coupled to a resistive switching array 110 as disclosed herein (e.g., see FIG. 1, supra or see memory array 1302 of FIG. 13, infra). A subset of resistive-switching array 110 is allocated to counter M bits 320 (or counter M bits 520 of FIG. 5) to store values of counter M bits 320 in resistive switching memory. A set of latch circuits 622, 624, 626 coupled to multiplexer 610 can provide data signals to update a value (e.g., increment, decrement) stored in counter M bits 320.

At initial power up of monotonic counter circuitry 600, latch circuits 622, 624, 626 can begin with '0' values and monotonic counter circuit 600 can shift data signals at subsequent clock cycles. For instance, a $1^{st}$ clock signal can change the latch circuits from zeros to 0 0 0 . . . 0 0 1; a $2^{nd}$ clock signal can change the latch circuits to 0 0 0 . . . 0 1 1; a $3^{rd}$ clock signal can change the latch circuits to 0 0 0 . . . 1 1 1, and so forth.

When latch circuit 622 corresponding to a MSB of counter M bits 320 (e.g., MSB 324; or MSB 524, etc.) is =1 and all Q nodes of latch circuits 622, 624, 626 are also '1', monotonic counter circuitry 600 begins shifting the MSB Qb= '0' value to a Q node of latch circuit 626 corresponding to a LSB of counter M bits 320. To this end, in response to MSB latch circuit 622=1, a count controller (e.g., counter control circuitry 126 of FIG. 1) can be configured to change MUX control 630 to pass Qb of the MSB latch circuit 622 to the input of latch circuit 626. In addition, although not depicted (but see base binary down counter 710 of FIG. 7, infra, for an inverse analogue) a base binary up counter circuit can increment a value of base N bits associated with counter M bits 320 in response to a Qb of MSB latch circuit 622 being '0'. The base N bits can likewise be stored at resistive-switching array 110. Furthermore, each clock cycle values of latch circuits 622, 624, 626 can be saved to non-volatile memory (e.g., resistive-switching array 110, or other non-volatile memory). In various embodiments, non-volatile memory storage options can be implemented at every counter update, custom interval, power down, or the like.

Once a count increment (or decrement) is complete in latch circuits 622, 624, 626 the newly shifted value(s) can be stored at counter M bits 320 through multiplexer 610. Following a next count, the non-volatile memory content can be recalled and shifted to the latch circuitry 622, 624, 626.

FIG. 7 illustrates a schematic diagram of an example non-volatile memory monotonic decrease counter with shift counter circuitry 700 according to alternative or additional embodiments of the present disclosure. Shift counter circuitry 700 includes latch circuitry 622, 624, 626 and MUX control 630 of FIG. 6, supra, communicatively coupled to multiplexer 610 as described above. Furthermore, a base binary down counter 710 is provided and also is communicatively coupled to multiplexer 610. Base binary down counter 710 includes a reset node 712, a recall from non-volatile memory base 714 and a store to non-volatile memory base 716. In various embodiments, base binary down counter 710 can be conventional binary down counter, but is not limited thereto and subsequently developed down counters can be substituted for base binary down counter 710 in some embodiments.

In an embodiment, base binary down counter 710 can be configured to decrement by one a value of base N bits when all counter bits of latch circuitry 622, 624, 626 transition from all '1's to '0'. The base N bits and associated counter M bits can be stored in resistive switching array 110 coupled to multiplexer to non-volatile array 610 as described above at FIG. 6. Base counter content can be recalled at power up, utilizing recall from non-volatile memory base 714. Furthermore, content of base binary down counter 710 can be stored to non-volatile memory at each access operation of shift counter circuit 700.

The diagrams included herein are described with respect to several circuits, controllers, and arrays of resistive switching devices or an integrated circuit device(s) comprising multiple circuits, controllers, or arrays. It should be appreciated that such diagrams can include those circuits, controllers, etc., specified therein, some of the specified circuits/controllers/arrays, or additional circuits/controllers/arrays not explicitly depicted but known in the art or reasonably conveyed to those of skill in the art by way of the context provided herein. Components of disclosed integrated circuit devices can also be implemented as sub-components of another disclosed component (e.g., input 140 and output 150 can be sub-components of controller 120), whereas other components disclosed as sub-components can be separate components in various embodiments (e.g., volatile resistive switching cells 118, or application characterized resistive switching cells 116 can be embodied in separate arrays as opposed to portions of array(s) 110). Further, embodiments within a particular Figure of the present specification can be applied in part or in whole to other embodiments depicted in other Figures without limitation, subject only to suitability to achieving a disclosed function or purpose as understood by one of skill in the art, and vice versa. As an illustrative (and non-limiting) example, array(s) 110 can be operably coupled with controller 120 as depicted or with controller 120 and some or all array control components of FIG. 13 (e.g., row control 1304, sense amps and write circuits 1308, etc.), or substituted for memory array 1302 of FIG. 13, and so forth. Additionally, it is noted that one or more disclosed processes can be combined into a single process providing aggregate functionality. For instance, a write process can comprise a read-verify process, or vice versa, to facilitate storing data at memory or generating data within memory and reading that stored/generated data, by way of a single process. Components of the disclosed architectures can also interact with one or more other components not specifically described herein but known by those of skill in the art.

In view of the exemplary diagrams described supra, process methods that can be implemented in accordance with the disclosed subject matter will be better appreciated with reference to the flow charts of FIGS. 8-12. While for purposes of simplicity of explanation, the methods of FIGS. 8-12 are shown and described as a series of blocks, it is to be understood and appreciated that the claimed subject matter is not limited by the order of the blocks, as some blocks may occur in different orders or concurrently with other blocks from what is depicted and described herein. Moreover, not all illustrated blocks may be required to implement the methods described herein, and in some embodiments additional steps known in the art or reasonably conveyed to one of ordinary skill in the art by way of the context provided herein can be implemented as part of a disclosed method within the scope of the present disclosure. Moreover, some steps illustrated as part of one process can be implemented for another process where suitable; other steps of one or more processes can be added or substituted in other processes disclosed herein within the scope of the present disclosure. Additionally, it should be further appreciated that the methods disclosed throughout this specification are capable of being stored on an article of manufacture to facilitate transporting and transferring such methods to an electronic device, stored in embedded memory within the electronic device, and so forth. The term article of manufacture, as used, is intended to encompass a computer program accessible from any computer-readable device, device in conjunction with a carrier, or storage medium, or the like.

Figure 8:
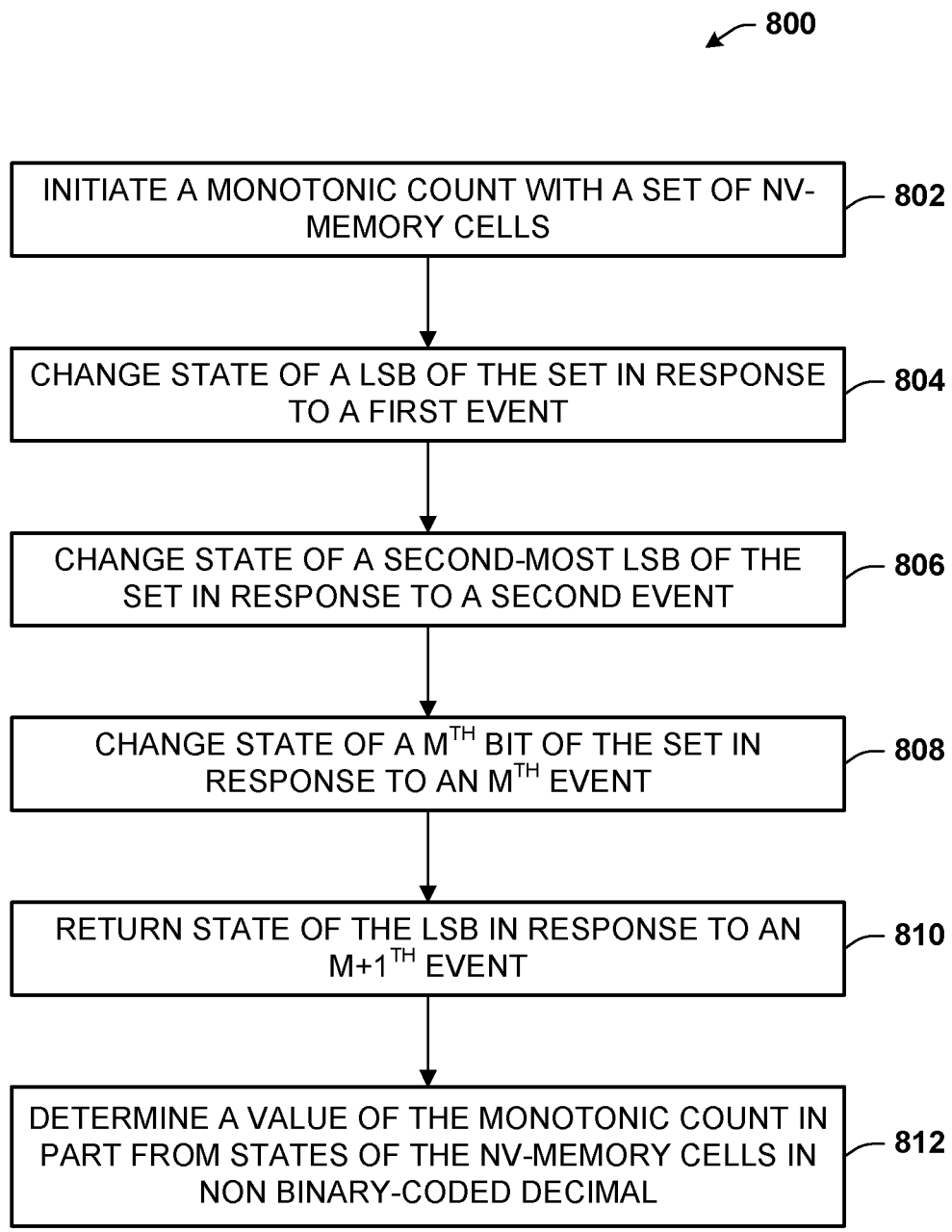
FIG. 8 illustrates a flowchart of a sample method for implementing a monotonic counter in resistive switching hardware, in still other embodiments.

FIG. 8 illustrates a flowchart of a sample method 800 for a monotonic counting algorithm according to alternative or additional embodiments of the present disclosure. Method 800, at 802, can comprise initiating a monotonic count with a set of non-volatile memory cells. In an embodiment, initiating the monotonic count can further comprise initiating a number, M, of non-volatile resistive switching memory cells for storing at least a portion of a variable count and characterizing one cell of the non-volatile resistive switching memory cells as a first cell and another cell of the non-volatile resistive switching memory cells as an $M^{th}$ cell. Method 800 can additionally comprise detecting occurrence of an event identified by the count algorithm, and at 804, method 800 can comprise changing a state of the first bit of the non-volatile resistive switching memory cells.

At 806, method 800 can comprise, in response to detecting a second occurrence of the event, changing a state of a second bit, adjacent to the first bit, of the non-volatile resistive switching memory cells. At 808, method 800 can comprise, in response to detecting an $M^{th}$ occurrence of the event where M is equal to the number of non-volatile resistive switching memory cells, changing a state of the $M^{th}$ cell of the non-volatile resistive switching memory cells.

Further, at 810, method 800 can comprise, in response to detecting an $M+1^{th}$ occurrence of the event, restoring an initial state of the first bit from the changed state to the initial state. In addition to the foregoing, at 812, method 800 can further comprise reading a value of the variable count. The value of the variable count can be determined at least in part by a non-binary coded decimal representation of bit states of the set of non-volatile resistive switching memory cells. In an embodiment(s), the variable count can be determined at least in part by adding the number of non-volatile resistive switching memory cells matching a read state of the first bit, wherein the read state of the first bit is defined as a state of the first bit at a time of reading the value of the variable count.

In one or more embodiments, reading the value of the variable count at reference number 812 need not be in any particular sequence relative to reference numbers 804 through 810. Rather, the variable count can be read at any suitable time following initiating the monotonic count at reference number 802. In some embodiments, reading the variable count at reference number 812 can be in response to receipt of a request, such as an external request, a host command, an application command, a system command, a network command initiated at a remote interconnected network device, or the like.

In one or more embodiments, method 800 can comprise incrementing a base multiplier value associated with the count algorithm by one in response to detecting the $M+1^{th}$ occurrence of the event, wherein the base multiplier value is stored in a second number, N, of non-volatile resistive switching memory cells less than the number, M. Method 800 can further comprise multiplying the incremented base multiplier value by the number M of the non-volatile resistive switching memory cells and generating a product, and adding to the product the number of non-volatile resistive switching memory cells matching the read state of the first bit. Method 800 can also comprise detecting a $2*M^{th}$ occurrence of the event, further incrementing the base multiplier value and changing the first bit from the restored initial state to the changed state. Still further, reading the value of the variable counter according to method 800 can further comprise multiplying the further incremented base multiplier value by the number M of the non-volatile resistive switching memory cells and generating a second product, and adding to the second product the number of non-volatile resistive switching memory cells matching the read state of the first bit.

According to additional embodiments of method 800, the number, M, of non-volatile resistive switching memory cells can be characterized to store the at least the portion of the variable count with a non-binary coded decimal (BCD) counting algorithm. Further, the number, N, of non-volatile resistive switching memory cells can be characterized to store the base multiplier value according to a BCD counting algorithm.

Figure 9:
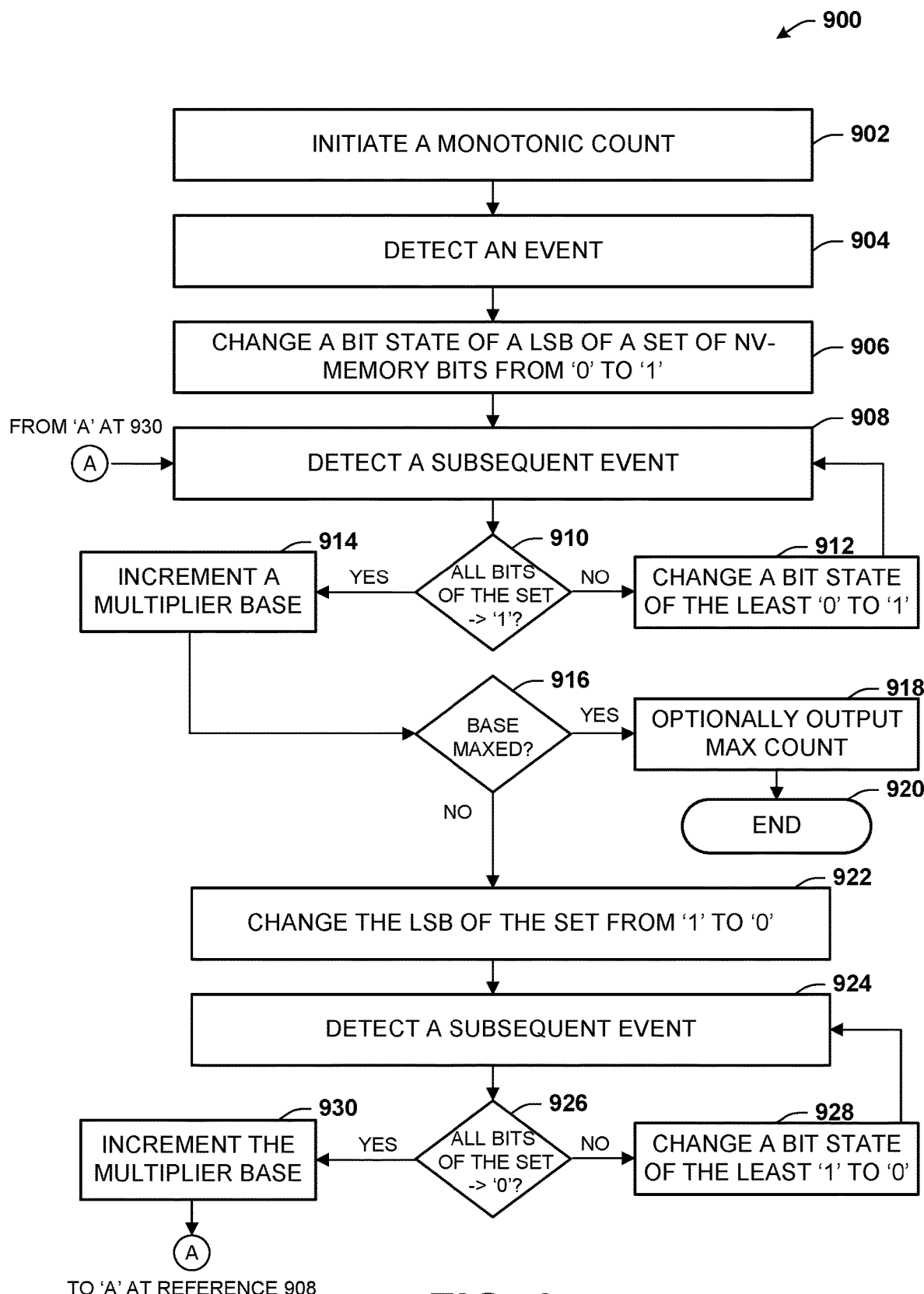
FIG. 9 depicts a flowchart of an example method for implementing a monotonic increase counter according to additional embodiments.

FIG. 9 illustrates an example flowchart of a method 900 for implementing a monotonic count in non-volatile memory according to further disclosed embodiments. At 902, method 900 can comprise initiating a monotonic count, and at 904 method 900 can comprise detecting an event identified by a counting algorithm. At 906, method 900 can comprise changing a bit state of a least significant bit (LSB) of a set of non-volatile memory bits from '0' to '1'.

At 908, method 900 can comprise detecting a subsequent event and at 910 a determination is made as to whether all bits of the set of non-volatile memory bits are set to '1'. If yes, method 900 can proceed to 914. If no, method 900 proceeds to 912 and a bit state of a least significant bit containing a '0' value is changed to '1', and method 900 returns to reference number 908.

At 914, method 900 can comprise incrementing a multiplier base value. At 916, a determination is made as to whether the multiplier base is at a maximum value. If the multiplier base is at the maximum value method 900 can proceed to 918 and optionally output a maximum count value and end at 920.

In response to the multiplier base not being at the maximum value, method 900 can proceed to 922 and change the LSB of the set from '1' to '0'. At 924, method 900 can comprise detecting a subsequent event. At 926, a determination is made as to whether all bits of the set of non-volatile memory bits are set to '0'. If not all bits are set to '0' method 900 can proceed to 928 and change a bit state of a least significant bit containing a '1' value to '0'. From 928 method 924 can return to reference number 924.

In response to all bits of the set of non-volatile memory bits being set to '0', method 900 can proceed to 930. At 930, method 900 can comprise incrementing the multiplier base. From 930, method 900 can return to reference number 908.

In one or more embodiments, method 900 can implement a read process to determine a current value of the monotonic count. In an embodiment, method 900 can receive a request to read the current value of the monotonic count. A read process can be implemented at any time subsequent to initiating the monotonic count at reference number 902 to determine the current value of the monotonic count. The request can be received from an external device, application, process, system, network, or the like, or can be incorporated as a step (or incorporated at multiple steps) of method 900, or a suitable combination of the foregoing.

Figure 10:
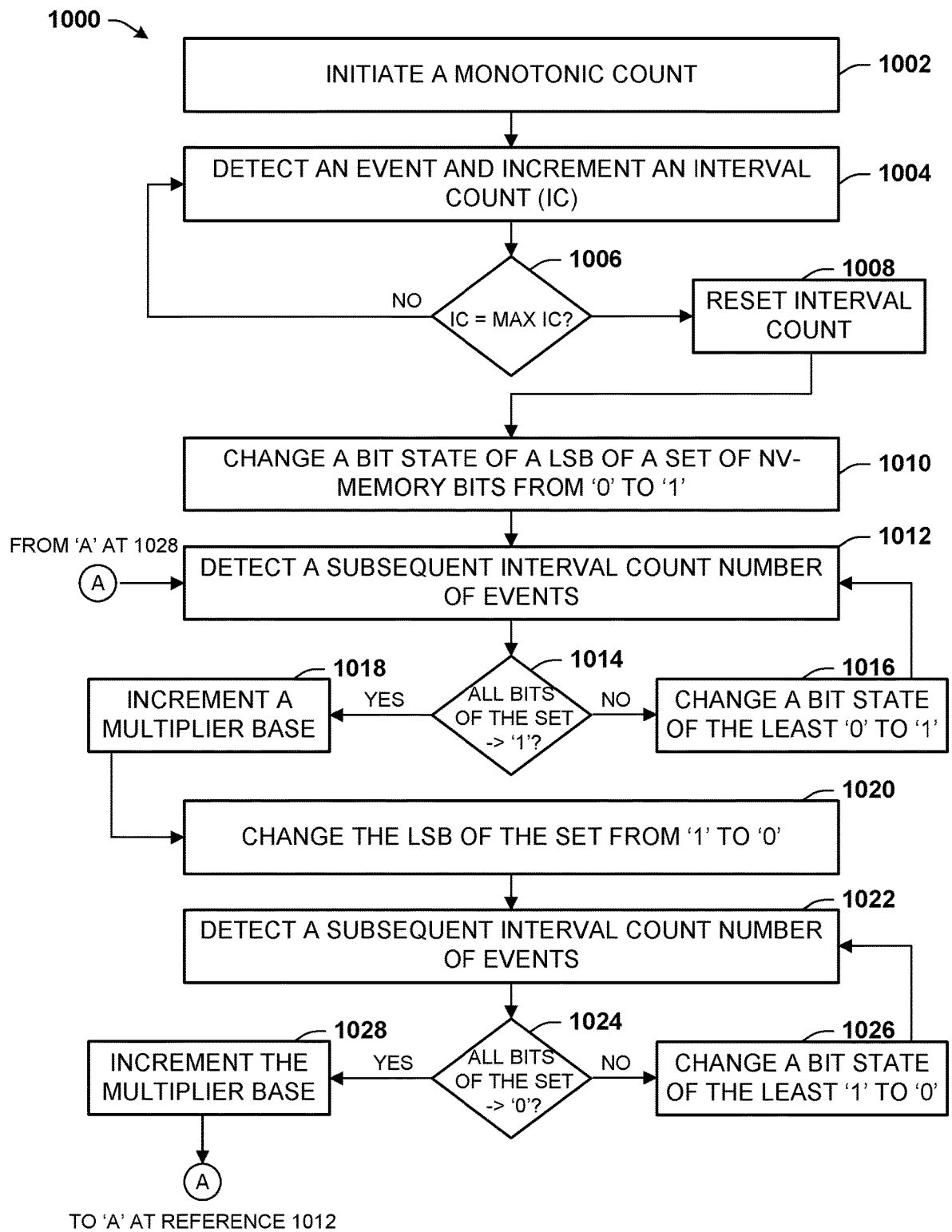
FIG. 10 depicts a flowchart of a sample method for implementing a monotonic increase counter according to alternative embodiments of the present disclosure.

FIG. 10 illustrates a flowchart of an example method 1000 for implementing a monotonic count according to further embodiments of the present disclosure. At 1002, method 1000 can comprise initiating a monotonic count, and at 1004 method 1000 can comprise detecting an event and incrementing an interval count (IC). At 1006, method 1000 can comprise whether IC is equal to a stored maximum IC value. If not, method 1000 can return to reference number 1004. If IC is equal to the stored maximum IC value, method 1000 can proceed to 1008 and reset an interval count for the IC and at 1010, method 1000 can comprise changing a bit state of a LSB (or, e.g., a primary bit) of a set of non-volatile memory bits from '0' to '1'.

At 1012, method 1000 can comprise detecting a subsequent IC number of events. At 1014, method 1000 can comprise determining whether all bits of the set of non-volatile memory bits are '1'. At 1016, method 1000 can comprise changing a bit state of a least significant bit containing a '0' to '1', and return to reference number 1012. At 1018, method 1000 can comprise incrementing a multiplier base value in response to all bits of the set of non-volatile memory bits being set to '1'.

At 1020, method 1000 can comprise changing the LSB of the set of non-volatile memory bits from '1' to '0'. At 1022, method 1000 can comprise detecting a subsequent interval count number of events. At 1024, method 1000 can comprise determining whether all bits of the set of non-volatile memory bits are set to '0'. If yes, method 1000 can proceed to 1028; otherwise, method 1000 proceeds to 1026 and changes a bit state of a least significant bit containing a '1' to '0', and returns to reference number 1022. At 1028, method 1000 can comprise incrementing the multiplier base and returning to reference number 1012.

In one or more additional embodiments, method 1000 can comprise reading a value of the variable of the variable count at least in part by adding a number, Y, of non-volatile memory cells matching a read state of the LSB. In some embodiments, reading the value of the variable counter further comprises determining a current state of the LSB, reading states of the set of non-volatile memory bits, determining the number, Y, of non-volatile memory bits including the LSB having the same state as the LSB, and multiplying the integer IC by the number Y.

In further embodiments, method 1000 can further comprise incrementing a base multiplier value of a base multiplier number in response to changing a most significant bit (e.g., a final bit) or MSB of the set of non-volatile memory bits to the changed state, detecting an M+1$^{th}$ instance of I$^{th}$ occurrences of the event, and changing the LSB of the set of non-volatile memory bits from the changed state to the original state and resetting the interval counter.

Further to the foregoing, reading the value of the variable counter further comprises multiplying the number, M, of the set of non-volatile memory bits by the base multiplier value to generate a cycle count, adding the number Y to the cycle count to generate a sum of the cycle count and Y, and multiplying the integer I by the sum of the cycle count and Y. In a further embodiment, method 1000 can comprise detecting an M+2$^{th}$ instance of I$^{th}$ occurrences of the event, and changing the second bit of the set of non-volatile memory bits to the original state and resetting the interval counter. Still further, method 1000 can comprise detecting a 2*M$^{th}$ instance of I$^{th}$ occurrences of the event, changing the MSB (e.g., a final bit in the set of non-volatile memory bits, or other bit selected as the final bit or MSB etc.) of the set of non-volatile memory bits from the changed state to the original state in response to the 2*M$^{th}$ instance of I$^{th}$ occurrences of the event and resetting the interval counter. Further, the method can comprise further incrementing the base multiplier value of the base multiplier number in response to changing the MSB to the original state from the changed state.

In one or more further embodiments of method 1000 the base multiplier value is stored in a set of non-volatile memory cells separate from the number, M, of the set of non-volatile memory bits. In yet another embodiment, incrementing the interval counter can further comprise incrementing a current interval value stored in volatile memory (e.g., volatile resistive switching cells 118 of FIG. 1; volatile memory 1410A of FIG. 14, or the like) in response to detecting occurrence of the event and resetting the interval value further comprises setting the current interval value to zero. In yet another embodiment, the stored maximum IC value can be stored in non-volatile memory.

In one or more embodiments, method 1000 can implement a read process to determine a current value of the monotonic count. In an embodiment, method 1000 can receive a request to read the current value of the monotonic count. A read process can be implemented at any time subsequent to initiating the monotonic count at reference number 1002 to determine the current value of the monotonic count. The request can be received from an external device, application, process, system, network, or the like, or can be incorporated as a step (or incorporated at multiple steps) of method 1000, or a suitable combination of the foregoing.

Figure 11:
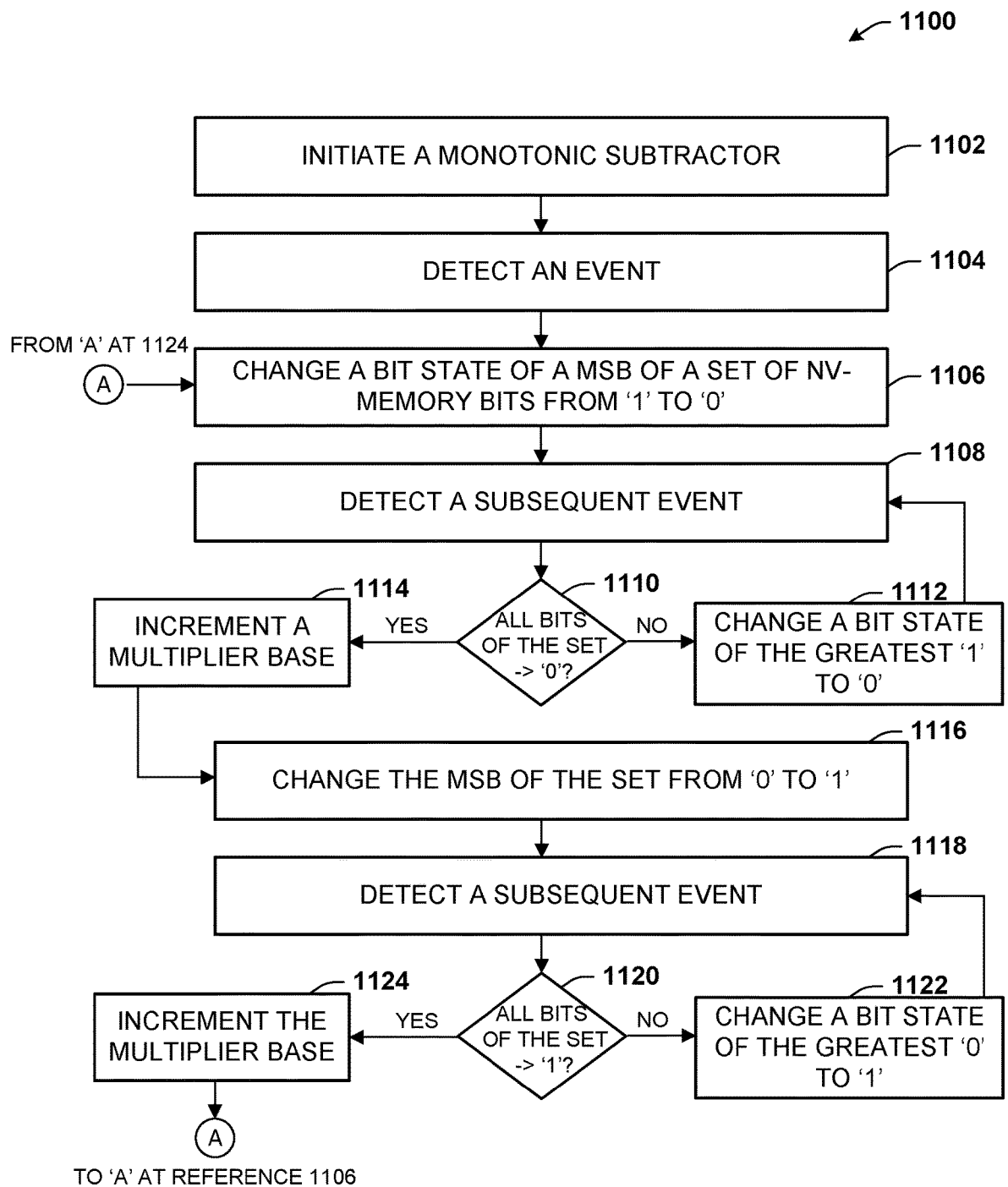
FIG. 11 illustrates a flowchart of an example method for operating a monotonic decrease counter in an embodiment(s)

FIG. 11 illustrates a flowchart of an example method 1100 for implementing a monotonic subtractor according to still further embodiments of the present disclosure. At 1102, method 1100 can comprise initiating a monotonic subtractor algorithm. At 1104, method 1100 can comprise detecting an event associated with the monotonic subtractor algorithm, and at 1106 method 1100 can comprise changing a bit state of a first bit (e.g., a MSB, a primary bit, or other suitable designation) of a set of non-volatile memory bits from a '1' state to a '0' state.

Method 1100, at 1108, can comprise detecting a subsequent event. At 1110, a determination can be made as to whether all bits of the set of non-volatile memory bits are set to the '0' state. If not, method 1100 can proceed to 1112 and comprise changing a bit state of a most significant bit having the '1' state to the '0' state. From 1112 method 1100 can return to reference number 1108.

In response to the determination at 1110, if all bits of the set of non-volatile memory bits are set to the '0' state method 1100 can proceed to 1114 and increment a multiplier base value associated with the monotonic subtractor algorithm. At 1116, method 1100 can comprise changing the first bit (e.g., the MSB) of the set of non-volatile memory bits from the 'O' state to the '1' state.

At 1118, method 1100 can comprise detecting a subsequent event, and at reference number 1120 a determination can be made as to whether all bits of the set of non-volatile memory bits are set to the '1' state. If not, method 1100 can proceed to reference number 1122 and can comprise changing a bit state of a most significant bit having the '0' state to the '1' state, and can return to reference number 1118. In response to all bits of the set of non-volatile memory bits being set to the '1' state method 1100 can proceed to reference number 1124 and can comprise incrementing the multiplier base. From 1124, method 1100 can return to reference number 1106 and change the first bit (e.g., the MSB) from the '1' state to the '0' state.

In one or more embodiments, method 1100 can implement a read process to determine a current value of the monotonic count. In an embodiment, method 1100 can receive a request to read the current value of the monotonic count. A read process can be implemented at any time subsequent to initiating the monotonic subtractor at reference number 1102 to determine the current value of the monotonic count. The request can be received from an external device, application, process, system, network, or the like, or can be incorporated as a step (or incorporated at multiple steps) of method 1100, or a suitable combination of the foregoing.

Figure 12:
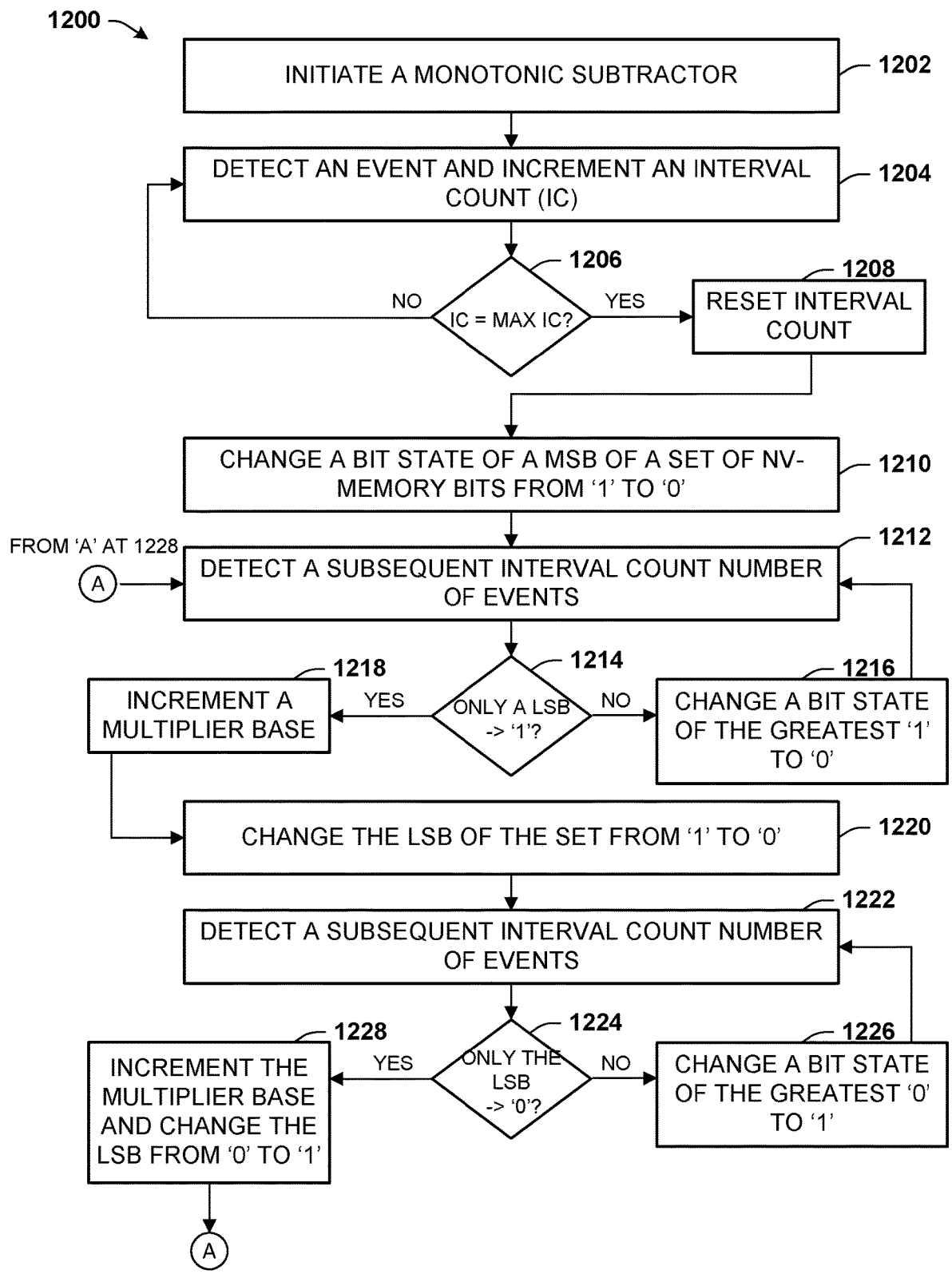
FIG. 12 depicts a flowchart of a sample method for operating a monotonic decrease counter in still further embodiments.

Referring now to FIG. 12, there is depicted a flowchart of a sample method 1200 for implementing a monotonic subtractor algorithm according to still further embodiments of the present disclosure. At 1202, method 1200 can comprise initiating the monotonic subtractor algorithm, and at 1204 method 1200 can comprise detecting an event associated with the monotonic subtractor algorithm and incrementing an interval count (IC) associated with the monotonic subtractor algorithm. At 1206, a determination is made as to whether the IC equals a stored maximum IC value. If the IC does not equal the stored maximum IC value method 1200 can return to reference number 1204; otherwise, method 1200 proceeds to 1208 and can comprise resetting an interval counter that maintains a current value of the IC.

Method 1200 can further comprise changing a bit state of a MSB (e.g., or a defined first bit, primary bit, or other suitable selected bit) of a set of non-volatile resistive switching bits from a '1' state to a '0' state. At 1212, method 1200 can comprise detecting a subsequent interval count number of events, and at 1214 a determination can be made as to whether all bits of the set of non-volatile resistive switching bits except a final bit of the set (e.g., a least significant bit-LSB or other suitably defined final bit) are set to the '0' state; or described differently: whether only the final bit (e.g., LSB) is still in the '1' state.

In response to the determination at 1214, if all bits of the set of non-volatile resistive switching bits are set to the '0' state except the final bit which is still in the '1' state, method 1200 can proceed to 1218. Otherwise, method 1200 proceeds to reference number 1216.

At 1216, method 1200 can comprise changing a bit state of a most significant bit of the set of non-volatile resistive switching bits having the '1' state to the '0' state. Method 1200 can return to reference number 1212 after reference number 1216.

At 1218, method 1200 can comprise incrementing a multiplier base value associated with the monotonic subtractor algorithm. At 1220, method 1200 can comprise changing the final bit (e.g., the LSB) of the set of non-volatile resistive switching bits from the '1' state to the '0' state. At 1222, method 1200 can comprise detecting a subsequent interval count number of events. At 1224, method 1200 can comprise determining whether only the final bit is still set to the '0' state. If not, method 1200 can proceed to 1226 and comprise changing a bit state of a most significant bit of the set of non-volatile resistive switching bits having the '0' state to the '1' state, and return to reference number 1222. If all bits of the set of non-volatile resistive switching bits are determined to be set to the '0' state except the final bit (e.g., LSB) at reference number 1224, method 1200 can proceed to 1228 and comprise incrementing the multiplier base value associated with the monotonic subtractor algorithm and change the final bit from the '0' state to the '1' state. From 1228, method 1200 can return to reference number 1212.

In one or more embodiments, method 1200 can implement a read process to determine a current value of the monotonic count. In an embodiment, method 1200 can receive a request to read the current value of the monotonic count. A read process can be implemented at any time subsequent to initiating the monotonic subtractor at reference number 1202 to determine the current value of the monotonic count. The request can be received from an external device, application, process, system, network, or the like, or can be incorporated as a step (or incorporated at multiple steps) of method 1200, or a suitable combination of the foregoing.

Example Operating Environments

Figure 13:
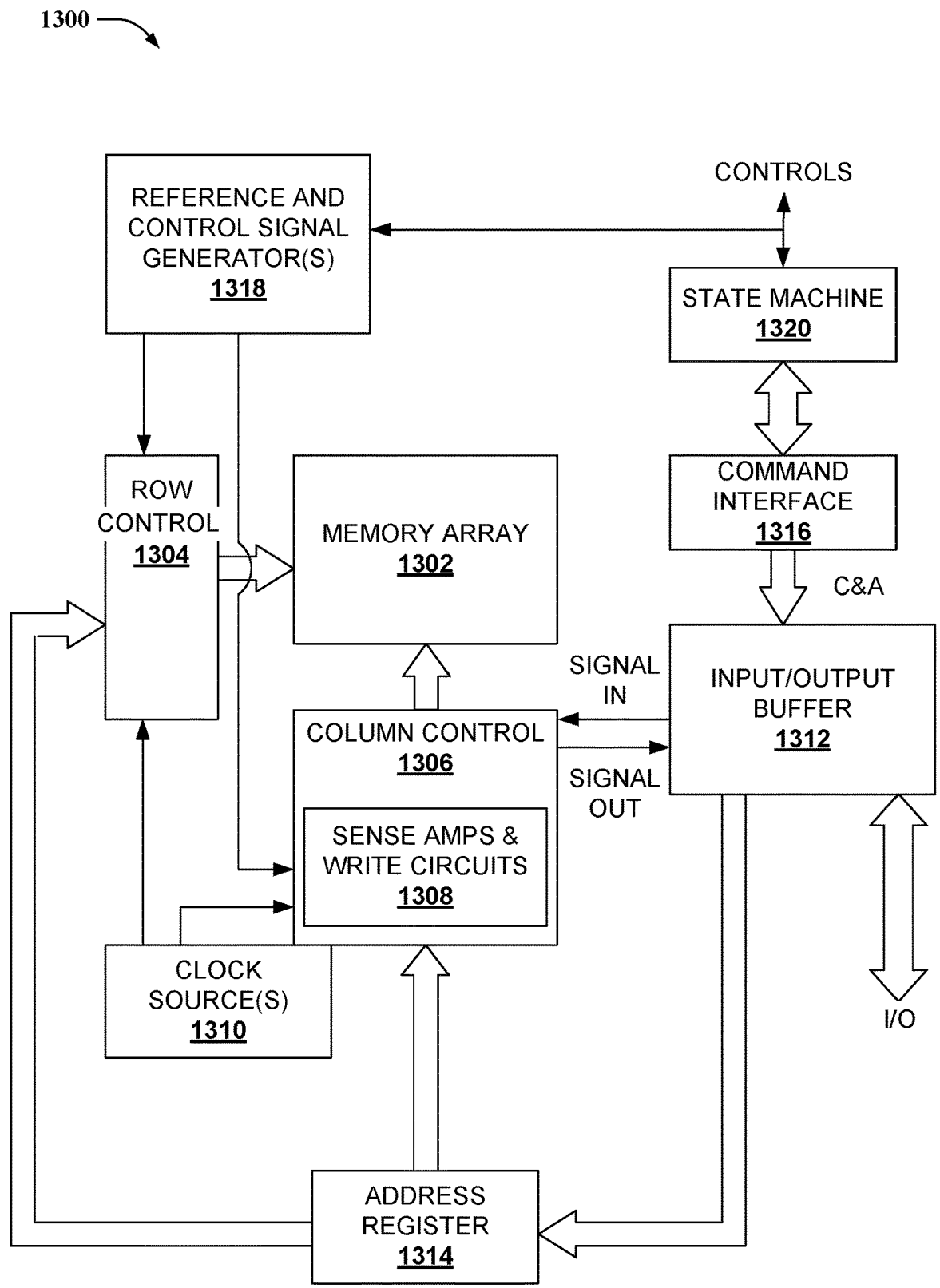
FIG. 13 illustrates a block diagram of an example electronic operating environment in accordance with one or more disclosed embodiments.

FIG. 13 illustrates a block diagram of an example operating and control environment 1300 for a memory array 1302 of a memory device according to aspects of the subject disclosure. Control environment 1300 and memory array 1302 can be formed within a single semiconductor die in some embodiments, although the subject disclosure is not so limited and in other embodiments some components of control environment 1300 can be formed on a separate semiconductor die communicatively linked to the single semiconductor die. In at least one aspect of the subject disclosure, memory array 1302 can comprise memory selected from a variety of memory cell technologies. In at least one embodiment, memory array 1302 can comprise a two-terminal memory technology, arranged in a compact two or three-dimensional architecture. Suitable two-terminal memory technologies can include resistive-switching memory, conductive-bridging memory, phase-change memory, organic memory, magneto-resistive memory, or the like, or a suitable combination of the foregoing. In a further embodiment, the two-terminal memory technology can be a two-terminal resistive switching technology.

A column controller 1306 including, sense amps and write circuits 1308 can be formed adjacent to memory array 1302. Moreover, column controller 1306 can be configured to activate (or identify for activation) a subset of bit lines of memory array 1302. Column controller 1306 can utilize a control signal(s) provided by a reference and control signal generator(s) 1318 to activate, as well as operate upon, respective ones of the subset of bitlines, applying suitable program, erase or read voltages to those bitlines. Non-activated bitlines can be kept at an inhibit voltage (also applied by reference and control signal generator(s) 1318), to mitigate or avoid bit-disturb effects on these non-activated bitlines.

In addition, operating and control environment 1300 can comprise a row controller 1304. Row controller 1304 can be formed adjacent to and electrically connected with word lines of memory array 1302. Also utilizing control signals of reference and control signal generator(s) 1318, row controller 1304 can select one or more rows of memory cells with a suitable selection voltage. Moreover, row controller 1304 can facilitate program, erase or read operations by applying suitable voltages at selected word lines.

Sense amps and write circuits 1308 can read data from and write data to (respectively), the activated memory cells of memory array 1302, which are selected by column control 1306 and row control 1304. Data read out from memory array 1302 can be provided to an input/output buffer 1312. Likewise, data to be written to memory array 1302 can be received from the input/output buffer 1312 and written to the activated memory cells of memory array 1302.

A clock source(s) 1310 can provide respective clock pulses to facilitate timing for read, write, and program operations of row controller 1304 and column controller 1306. Clock source(s) 1310 can further facilitate selection of word lines or bit lines in response to external or internal commands received by operating and control environment 1300. Input/output buffer 1312 can comprise a command and address input, as well as a bidirectional data input and output. Instructions are provided over the command and address input, and the data to be written to memory array 1302 as well as data read from memory array 1302 is conveyed on the bidirectional data input and output, facilitating connection to an external host apparatus, such as a computer or other processing device (not depicted, but see e.g., computer 1402 of FIG. 14, infra).

Input/output buffer 1312 can be configured to receive write data, receive an erase instruction, receive a status or maintenance instruction, output readout data, output status information, and receive address data and command data, as well as address data for respective instructions. Address data can be transferred to row controller 1304 and column controller 1306 by an address register 1314. In addition, input data is transmitted to memory array 1302 via signal input lines between column control 1306 and input/output buffer 1312, and output data is received from memory array 1302 via sense amps (1308) and provided on signal output lines to input/output buffer 1312. Input data can be received from the host apparatus, and output data can be delivered to the host apparatus via the I/O bus.

Commands received from the host apparatus can be provided to a command interface 1316. Command interface 1316 can be configured to receive external control signals from the host apparatus and determine whether data input to the input/output buffer 1312 is write data, a command, or an address. Input commands can be transferred to a state machine 1320.

State machine 1320 can be configured to manage programming and reprogramming of memory array 1302. Instructions provided to state machine 1320 are implemented according to control logic configurations, enabling state machine 1320 to manage read, write, erase, data input, data output, and other functionality associated with memory cell array 1302. In some aspects, state machine 1320 can send and receive acknowledgments and negative acknowledgments regarding successful receipt or execution of various commands. In further embodiments, state machine 1320 can decode and implement status-related commands, decode and implement configuration commands, and so on.

To implement read, write, erase, input, output, etc., functionality, state machine 1320 can control clock source(s) 1310 or reference and control signal generator(s) 1318. Control of clock source(s) 1310 can cause output pulses configured to facilitate row controller 1304 and column controller 1306 implementing the particular functionality. Output pulses can be transferred to selected bit lines by column controller 1306, for instance, or word lines by row controller 1304, for instance.

Figure 14:
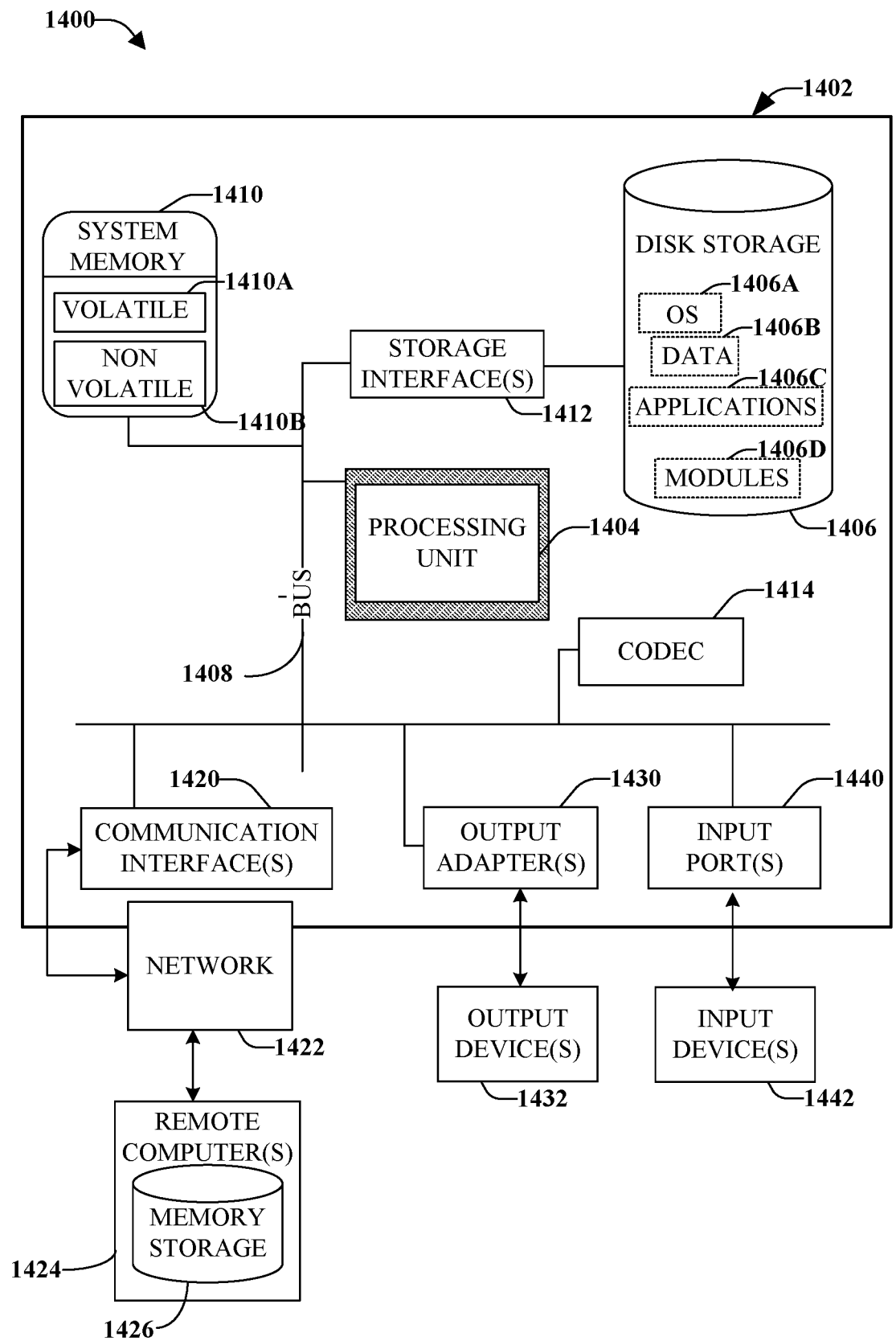
FIG. 14 illustrates a block diagram of an example computing environment for implementing one or more embodiments of the present disclosure.

In connection with FIG. 14, the systems, devices, or processes described herein can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

With reference to FIG. 14, a suitable environment 1400 for implementing various aspects of the claimed subject matter includes a computer 1402. The computer 1402 includes a processing unit 1404, a system memory 1410, a codec 1414, and a system bus 1408. The system bus 1408 couples system components including, but not limited to, the system memory 1410 to the processing unit 1404. The processing unit 1404 can be any of various available processors. Dual microprocessors and other multiprocessor architectures also can be employed as the processing unit 1404.

The system bus 1408 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1410 includes volatile memory 1410A and non-volatile memory 1410B. The basic input/output system (BIOS), containing the basic routines to transfer information between elements within the computer 1402, such as during start-up, is stored in non-volatile memory 1410B. In addition, according to present innovations, codec 1414 may include at least one of an encoder or decoder, wherein the at least one of an encoder or decoder may consist of hardware, software, or a combination of hardware and software. Although, codec 1414 is depicted as a separate component, codec 1414 may be contained within non-volatile memory 1410B. By way of illustration, and not limitation, non-volatile memory 1410B can include read only memory (ROM), programmable ROM (PROM), electrically programmable ROM (EPROM), electrically erasable programmable ROM (EEPROM), or flash memory, two-terminal memory, and so on. Volatile memory 1410A includes random access memory (RAM), and in some embodiments can embody a cache memory. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) among others.

Computer 1402 may also include removable/non-removable, volatile/non-volatile computer storage medium. FIG. 14 illustrates, for example, disk storage 1406. Disk storage 1406 includes, but is not limited to, devices like a magnetic disk drive, solid state disk (SSD) floppy disk drive, tape drive, Jaz drive, Zip drive, LS-100 drive, flash memory card, or memory stick, universal serial bus (USB) memory, mini-USB memory, micro-USB memory and other modalities of non-volatile memory hardware. In addition, disk storage 1406 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1406 to the system bus 1408, a removable or non-removable interface is typically used, such as storage interface 1412. It is appreciated that storage devices 1406 can store information related to a user. Such information might be stored at or provided to a server or to an application running on a user device. In one embodiment, the user can be notified (e.g., by way of output device(s) 1432) of the types of information that are stored to disk storage 1406 or transmitted to the server or application. The user can be provided the opportunity to opt-in or opt-out of having such information collected and/or shared with the server or application (e.g., by way of input from input device(s) 1442).

It is to be appreciated that FIG. 14 describes software that acts as an intermediary between users and the basic computer resources described in the suitable operating environment 1400. Such software includes an operating system 1406A. Operating system 1406A, which can be stored on disk storage 1406, acts to control and allocate resources of the computer system 1402. Applications 1406C take advantage of the management of resources by operating system 1406A through program modules 1406D, and program data 1406D, such as the boot/shutdown transaction table and the like, stored either in system memory 1410 or on disk storage 1406. It is to be appreciated that the claimed subject matter can be implemented with various operating systems or combinations of operating systems.

A user enters commands or information into the computer 1402 through input device(s) 1442. Input devices 1442 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1404 through the system bus 1408 via input port(s) 1440. Input port(s) 1440 include, for example, a serial port, a parallel port, a game port, and a universal serial bus (USB). Output device(s) 1432 use some of the same type of ports as input device(s) 1442. Thus, for example, a USB port may be used to provide input to computer 1402 and to output information from computer 1402 to an output device 1432. Output adapter 1430 is provided to illustrate that there are some output devices 1432 like monitors, speakers, and printers, among other output devices 1432, which require special adapters. The output adapters 1430 include, by way of illustration and not limitation, video and sound cards that provide a means of connection between the output device 1432 and the system bus 1408. It should be noted that other devices and/or systems of devices provide both input and output capabilities such as remote computer(s) 1438.

Computer 1402 can operate in a networked environment using logical connections to one or more remote computers, such as remote computer(s) 1424. The remote computer(s) 1424 can be a personal computer, a server, a router, a network PC, a workstation, a microprocessor based appliance, a peer device, a smart phone, a tablet, or other network node, and typically includes many of the elements described relative to computer 1402. For purposes of brevity, only a memory storage device 1426 is illustrated with remote computer(s) 1424. Remote computer(s) 1424 is logically connected to computer 1402 through a network 1422 and then connected via communication interface(s) 1420. Network 1422 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication interface(s) 1420 refers to the hardware/software employed to connect the network 1422 to the bus 1408. While communication interface(s) 1420 is shown for illustrative clarity inside computer 1402, it can also be external to computer 1402. The hardware/software necessary for connection to the network 1422 includes, for exemplary purposes only, internal and external technologies such as, modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules or stored information, instructions, or the like can be located in local or remote memory storage devices.

Moreover, it is to be appreciated that various components described herein can include electrical circuit(s) that can include components and circuitry elements of suitable value in order to implement the embodiments of the subject disclosure. Furthermore, it can be appreciated that many of the various components can be implemented on one or more IC chips. For example, in one embodiment, a set of components can be implemented in a single IC chip. In other embodiments, one or more of respective components are fabricated or implemented on separate IC chips.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts and/or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising".

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for counting in non-volatile resistive switching memory, comprising:
   initiating a count algorithm;
   initializing a number, M, of non-volatile memory (NVM) cells for storing a portion of a variable count and characterizing one cell of the NVM cells as a primary bit (PB) and another cell of the NVM cells as a final bit (FB);
   detecting occurrence of an event associated with the count algorithm;
   incrementing an interval counter in response to detecting occurrence of the event;
   detecting an $I^{th}$ occurrence of the event, wherein I is an integer specified by the count algorithm to be greater than one;
   changing a state of the PB of the NVM cells from an original state to a changed state and resetting the interval counter in response to detecting the $I^{th}$ occurrence of the event;
   detecting a second $I^{th}$ occurrence of the event and resetting the interval counter;
   changing a second bit of the NVM cells to the changed state and resetting the interval counter;
   detecting an $M^{th}$ instance of $I^{th}$ occurrences of the event and resetting the interval counter, where M is equal to the number of NVM cells;
   changing the FB of the NVM cells to the changed state; and
   reading a value of the variable count at least in part by adding a number, Y, of NVM cells matching a read state of the PB.

2. The method of claim 1, wherein reading the value of the variable count further comprises:
   determining a current state of the PB;
   reading states of the NVM cells;
   determining the number, Y, of NVM cells, including the PB, having the same state as the PB; and
   multiplying the integer I by the number Y.

3. The method of claim 2, further comprising:
   incrementing a base multiplier value of a base multiplier number in response to changing the FB of the NVM cells to the changed state;
   detecting an $M+1^{th}$ instance of $I^{th}$ occurrences of the event; and
   changing the PB of the NVM cells from the changed state to the original state and resetting the interval counter.

4. The method of claim 3, wherein reading the value of the variable counter further comprises:
   multiplying the number, M, of NVM cells by the base multiplier value to generate a cycle count;
   adding the number Y to the cycle count to generate a sum of the cycle count and Y; and
   multiplying the integer I by the sum of the cycle count and Y.

5. The method of claim 3, further comprising:
   detecting an M+2th instance of $I^{th}$ occurrences of the event; and
   changing the second bit of the NVM cells to the original state and resetting the interval counter.

6. The method of claim 5, further comprising:
   detecting a $2*M^{th}$ instance of $I^{th}$ occurrences of the event;
   changing the FB of the NVM cells from the changed state to the original state and resetting the interval counter; and
   further incrementing the base multiplier value of the base multiplier number in response to changing the FB of the NVM cells to the original state from the changed state.

7. The method of claim 3, wherein the base multiplier value is stored in a set of NVM cells separate from the number, M, of NVM cells.

8. The method of claim 1, wherein incrementing the interval counter further comprises incrementing a current interval value stored in volatile memory in response to detecting occurrence of the event and resetting the interval value further comprises setting the current interval value to zero.

9. The method of claim 8, wherein the integer I is a fixed value stored in non-volatile memory.

* * * * *